US005781561A

United States Patent [19]
Machida et al.

[11] Patent Number: 5,781,561
[45] Date of Patent: Jul. 14, 1998

[54] ENCODING APPARATUS FOR HIERARCHICALLY ENCODING IMAGE SIGNAL AND DECODING APPARATUS FOR DECODING THE IMAGE SIGNAL HIERARCHICALLY ENCODED BY THE ENCODING APPARATUS

[75] Inventors: Yutaka Machida; Koji Imura, both of Yokohama, Japan

[73] Assignee: Matsushita Electric Industrial Co., Ltd., Osaka, Japan

[21] Appl. No.: 616,423

[22] Filed: Mar. 15, 1996

[30] Foreign Application Priority Data

Mar. 16, 1995 [JP] Japan .................................. 7-083522
Oct. 25, 1995 [JP] Japan .................................. 7-299317

[51] Int. Cl.[6] .......................... H03M 13/00; H04N 1/415
[52] U.S. Cl. ..................... 371/37.01; 348/408; 371/37.05
[58] Field of Search ........................... 371/37.1, 37.01, 371/37.05; 348/403, 408

[56] References Cited

U.S. PATENT DOCUMENTS

| 5,006,931 | 4/1991 | Shirota ........................ 348/408 |
| 5,105,442 | 4/1992 | Wei ............................. 375/262 |
| 5,122,875 | 6/1992 | Raychaudhuri et al. ......... 358/133 |
| 5,231,486 | 7/1993 | Acampora et al. ............. 348/390 |
| 5,524,025 | 6/1996 | Lawrence et al. .............. 375/260 |

FOREIGN PATENT DOCUMENTS 4322591  11/1992  Japan .

OTHER PUBLICATIONS

"Variable Bit–Rate Coding Of Video Signals For ATM Networks" by F. Kishino et al; IEEE Journal On Selected Areas In Communications, vol. 7, No. 5, Jun. 1989 pp. 801–806.

"Design And Performance Evaluation Of A Variable Bit–Rate (VBR) Video Compensation Algorithm For ATM Networks" by K. Joseph et al; Globecom '91; pp. 0009–0015.

"Information Technology–Generic Coding of Moving Pictures And Associated Audio Information" ITU–T Draft Rec. H 262; Tuesday 10 May 1994.

"Performance Evaluation Of The Reed–Solomon/Convolutional Concatenated Coding Scheme And Its Application To The Satellite Communication" by M. Ohashi et al;.

*Primary Examiner*—Stephen M. Baker
*Attorney, Agent, or Firm*—Lowe Hauptman; Gopstein & Berner

[57] ABSTRACT

Important quantized coefficients having absolute values which are higher than a threshold value are extracted from each of quantized coefficient streams into which a digital image signal is transformed, and an important quantized coefficient stream composed of the important quantized coefficients and zero-valued quantized coefficients is produced on condition that the number of important quantized coefficients and zero-valued quantized coefficients is equal to that of quantized coefficients in each quantized coefficient stream and positions of the important quantized coefficients in the important quantized coefficient stream are the same as those in a corresponding quantized coefficient stream. Also, a lesser-important quantized coefficient stream is produced by subtracting the important quantized coefficient stream from the corresponding quantized coefficient stream. Stronger error correction codes are added to each important quantized coefficient stream and are transmitted to a decoding apparatus, and less-strong error correction codes are added to each lesser-important quantized coefficient stream and are transmitted to the decoding apparatus. Therefore, an image having a superior quality can be reproduced with a high code efficiency.

18 Claims, 18 Drawing Sheets

POSITION OF LOWEST-ORDER QUANTIZED COEFFICIENT

POSITION OF HIGHEST-ORDER QUANTIZED COEFFICIENT

ENCODING APPARATUS FOR HIERARCHICALLY ENCODING IMAGE SIGNAL AND DECODING APPARATUS FOR DECODING THE IMAGE SIGNAL HIERARCHICALLY ENCODED BY THE ENCODING APPARATUS

BACKGROUND OF THE INVENTION

1. Field of the Invention

The present invention relates generally to encoding and decoding apparatuses for respectively encoding or decoding a digital image signal used for a visual telephone or a picturephone meeting, and more particularly to encoding and decoding apparatuses for preventing the deterioration of a quality of a decoded image signal.

2. Description of the Related Art

In a conventional image signal encoding apparatus, a digital image signal is divided into a plurality of blocks respectively composed of a plurality of pixels, and a plurality of operations such as a motion estimation, a motion compensation, an orthogonal transformation, a quantization and a variable-length encoding are performed for each of the blocks, and a variable-length code stream is output. Also, in a conventional image signal decoding apparatus, a plurality of inverse operations such as a variable-length code decoding operation, an inverse quantization, an inverse orthogonal transformation and a motion compensation are performed to reproduce each of the blocks, the blocks are rearranged, and the digital image signal is reproduced.

In the encoding and decoding apparatuses, spatial redundancy and time redundancy existing in the image signal are removed, and the image signal expressed by a small number of codes is efficiently transmitted and stored.

In this case, because a code stream output from the conventional image signal encoding apparatus is a variable-length code stream, it is generally impossible to start a decoding operation from the middle of the variable-length code stream. Therefore, in cases where a bit error (or code error) occurs in a particular code of the variable-length code stream in a transmission channel or a storing medium, it becomes impossible to correctly decode a plurality of codes following the particular code in the stream in the conventional image signal decoding apparatus.

To avoid the above drawback caused by the bit error, a unique fixed-length synchronizing word is inserted in the variable-length code stream at regular intervals. Therefore, even though a bit error (or code error) occurs in a particular code of the variable-length code stream, a plurality of codes following a particular fixed-length synchronizing word positioned after the particular code in the code stream can be correctly decoded. However, a plurality of codes positioned between the particular code (or an erred bit) and the particular fixed-length synchronizing word cannot be correctly decoded, a remarkable volume of image information is lost, and a quality of a reproduced image considerably and subjectively deteriorates. Also, in cases where an error checking and correction is performed for the variable-length code stream output from the conventional image signal encoding apparatus, an occurrence frequency of the bit error can be lowered. However, because error correction codes are added to the variable-length code stream, a transmission efficiency and a storing efficiency for the variable-length code stream are considerably lowered.

To avoid the above drawback, a hierarchically layered coding technique is proposed in a literature "Variable Bit-Rate Coding of Video Signals for ATM" IEEE Journal on Selected Areas in Communications Vol. 7, No. 5, pp. 801–806, June, 1989, a literature IEEE GLOBECOM '91, Conference Record, Vol. 1, pp. 9–15, December, 1991, and a literature ISO/IEC DIS 13818-2, pp.114–172, May, 1994. In the hierarchically layered coding technique, orthogonal transforming coefficients are divided into a group of low frequency components and a group of high frequency components, each group is changed to a variable-length code stream, a variable-length code stream relating to the group of low frequency components takes a high priority because the group of low frequency components is visually important, a variable-length code stream relating to the group of high frequency components takes a low priority because the group of high frequency components is visually lesser-important, and each of the code streams is transmitted and stored. The hierarchically layered coding technique is described in detail with reference to FIG. 1.

2.1. First Previously Proposed Art

FIG. 1 is a block diagram of a conventional image signal encoding apparatus operated according to the hierarchically layered coding technique with high and low priority.

As shown in FIG. 1, a conventional image signal encoding apparatus 701 is composed of a block extracting circuit 702 for extracting a plurality of blocks respectively composed of 8*8 pixels one after another from each of frames of digital dynamic image signals input to the apparatus 701 one after another, a frame memory 709 for storing a reconstructed frame which is composed of a plurality of reconstructed blocks as a reconstructed preceding frame;

a motion estimating circuit 711 for detecting a motion vector indicating a block of the reconstructed preceding frame stored in the frame memory 709 from which a current block extracted by the block extracting circuit 702 is moved, a motion compensating circuit 710 for extracting a block of the preceding frame indicated by the motion vector detected by the motion estimating circuit 711 from the reconstructed preceding frame stored in the frame memory 709 and outputting the extracted block as a predicted block;

a subtracting circuit 703 for calculating a difference between the current block and the predicted block and outputting the difference as a predicted error block, an orthogonal transforming circuit 704 for orthogonally transforming the predicted error block to form a coefficient block, a quantizing circuit 705 for quantizing the coefficient block to form a quantized coefficient block, a inverse quantizing circuit 706 for inversely quantizing the quantized coefficient block for the purpose of reconstructing the current block and outputting a reconstructed coefficient block, a inverse orthogonal transforming circuit 707 for inversely orthogonally-transforming the reconstructed coefficient block to produce a reproduce predicted error block, an adding circuit 708 for adding the predicted block output from the motion compensating circuit 710 and the reconstructed predicted error block to obtain a reconstructed current block and storing the reconstructed current block in the frame memory 709 as a reconstructed preceding frame renewed, a scanning circuit 712 for transforming the quantized coefficient block quantized by the quantizing circuit 705 into a one-dimensional quantized coefficient stream for each of blocks extracted by the block extracting circuit 702, a priority selecting circuit 713 for dividing each one-dimensional quantized coefficient stream output from the scanning circuit 712 into a high priority quantized coefficient stream allocated in a high priority hierarchy and a low priority quantized coefficient stream allocated in a low priority hierarchy, a first two-dimensional variable-length encoding circuit 714 for encoding the low priority quantized coefficient stream in two-dimensional variable-length to produce a low priority variable-length code stream, a second two-dimensional variable-length encoding circuit 723 for encoding the high priority quantized coefficient stream in two-dimensional variable-length to produce a high priority variable-length code stream, a first code stream buffer 715 for temporarily storing the low priority variable-length code stream, a quantizing step control circuit 726 for setting a quantizing step influencing a code volume of the high priority quantized coefficient stream and a code volume of the low priority quantized coefficient stream, a priority break point controlling circuit 727 for setting a priority break point influencing a ratio of a code volume of the high priority quantized coefficient stream to a code volume of the low priority quantized coefficient stream, a quantizing step encoding circuit 724 for encoding the quantizing step, a priority break point encoding circuit 718 for encoding the priority break point, a motion vector encoding circuit 725 for encoding the motion vector detected by the motion estimating circuit 711, a multiplexing 719 for multiplying the high priority variable-length code stream produced by the second two-dimensional variable-length encoding circuit 723 and code stream control information composed of the priority break point encoded by the priority break point encoding circuit 718, the quantizing step encoded by the quantizing step encoding circuit 724 and the motion vector encoded by the motion vector encoding circuit 725 to produce a multiplied variable-length code stream, a second code stream buffer 720 for temporarily storing the multiplied variable-length code stream.

a first error correction code adding circuit 716 for adding a less-strong error correction code to the low priority variable-length code stream stored in the first code stream buffer 715, and a second error correction code adding circuit 721 for adding a stronger error correction code to the multiplied variable-length code stream stored in the second code stream buffer 720.

In the above configuration, when a frame of digital dynamic image signal is input to the encoding apparatus 701 as a current frame, a plurality of blocks respectively composed of 8*8 pixels are extracted from the current frame one after another in the block extracting circuit 702, and each of the blocks is transmitted to the motion estimating circuit 711 and the subtracting circuit 703 as a current block.

In the motion estimating circuit 711, the reconstructed preceding frame stored in the frame memory 709 and the current block are compared with each other, and a motion vector is output. The motion vector indicates a block of the reconstructed preceding frame from which the current block is moved. Therefore, the motion vector indicates a degree of spatial displacement. Thereafter, the motion vector is transmitted to the motion compensating circuit 710. In the circuit 710, a block composed of 8*8 pixels indicated by the motion vector is extracted from the reconstructed preceding block stored in the frame memory 709 according to the motion, and the block is transmitted to the subtracting circuit 703 as a predicted block for the current block.

In the subtracting circuit 703, a value of each pixel of the predicted block is subtracted from a value of a corresponding pixel of the current block, and a predicted error block composed of 8*8 pixels having subtracted values. In this case, because the predicted block is very similar to the current block on condition that the detection of the motion vector is skillfully performed, pixel energy (or pixel values) of the pixels of the predicted error block is considerably lower than that of the current block.

Thereafter, the predicted error block is orthogonally transformed in the orthogonal transforming circuit 704, and a coefficient block composed of 8*8 coefficients is output. In this case, a discrete cosine transformation is used as the orthogonal transformation. In general, in cases where the discrete cosine transformation is performed for a plurality of stationary signals highly correlating to each other, energy of the coefficient block is concentrated to a small number of low-order coefficients, and entropy of the coefficient block can be reduced. In a strict meaning, the discrete cosine transformation is not a map toward a frequency axis obtained in a discrete Fourier transformation. However, low-order coefficients correspond to low spatial frequencies, and high-order coefficients correspond to high spatial frequencies.

Thereafter, the coefficient block is quantized in the quantizing circuit 705 according to a quantizing step set by the quantizing step control circuit 726, and a quantized coefficient block composed of 8*8 quantized coefficients is output. In this case, many of the quantized coefficients become a zero value.

Thereafter, a local decoding processing for obtaining a reconstructed current frame used for the prediction of a succeeding frame is performed in the circuits 706 to 708. In detail, the quantized coefficient block is inversely quantized in the inverse quantizing circuit 706 according to the same quantizing step, and a reconstructed coefficient block composed of 8*8 reconstructed coefficients is output. Thereafter, the reconstructed coefficient block is inversely orthogonal-transformed in the inverse orthogonal transforming circuit 707, and a reconstructed predicted error block is output. Thereafter, a value of each of pixels of the reconstructed predicted error block is added to a value of a corresponding pixel of the predicted block in the adding circuit 708, and a reconstructed current block composed of 8*8 reconstructed pixels having added values is produced. The production of the reconstructed current block is performed each time one of the blocks of the current frame is extracted as the current block in the block extracting circuit 702.

Thereafter, the reconstructed current blocks produced by the adding circuit 708 are stored in the frame memory 709 one after another. When all reconstructed current blocks corresponding to the current frame are stored, a reconstructed current frame is prepared in the frame memory 709 and is used for the prediction of a succeeding frame input to the block extracting circuit 702 just after the current frame.

Also, the quantized coefficient blocks produced in the quantizing circuit 705 one after another are processed in the circuits 712 to 716, 718 to 721, and 723 to 727 according to a hierarchically layered coding technique with priority. In detail, each of the quantized coefficient blocks is scanned in the scanning circuit 712. That is, as shown in FIG. 2, the scanning is performed in zigzag directions from a lowest-order quantized coefficient placed on an upper left side to a highest-order quantized coefficient placed on a lower right side, and two-dimensional quantized coefficients of each quantized coefficient block are transformed into a one-dimensional quantized coefficient stream in which a plurality of quantized coefficients are arranged in the order from a quantized coefficient corresponding to the lowest spatial frequency to a quantized coefficient corresponding to the highest spatial frequency.

Thereafter, each one-dimensional quantized coefficient stream is divided into a high priority quantized coefficient stream and a low priority quantized coefficient stream in the priority selecting circuit 713 according to a priority break point set by the priority break point controlling circuit 727. In detail, a non-zero quantized coefficient (or a level) having a non-zero value and the number of zero-valued quantized coefficients (or a zero run length) which have a zero value and are placed just before the non-zero quantized coefficient in one one-dimensional quantized coefficient stream are defined, a quantized coefficient stream composed of one non-zero quantized coefficient and the zero-valued quantized coefficients is called a two-dimensional event expressed by a set Ev=(zero run length, level). In this case, the priority break point indicates the number of two-dimensional events allocated to a high priority hierarchy. Therefore, one or more quantized coefficient streams respectively classified as the two-dimensional event are allocated to a high priority hierarchy until the number of two-dimensional events occurring in one one-dimensional quantized coefficient stream reaches the priority break point.

For example, in cases where a particular one-dimensional quantized coefficient stream {3,0,1,0,0,−2,0,0, - - - , 0,0} is input to the priority selecting circuit 713 and the priority break point indicates 2, a first quantized coefficient stream {3} is detected as a first two-dimensional event Ev=(0,3), a second quantized coefficient stream {0,1} is detected as a second two-dimensional event Ev=(1,1), and a third quantized coefficient stream {0,0,−2} is detected as a third two-dimensional event Ev=(2,−2). Therefore, a quantized coefficient stream {3,0,1} is allocated to a high priority hierarchy as a high priority quantized coefficient stream, and a remaining quantized coefficient stream {0,0,−2,0,0, - - - , 0,0} corresponding to the third two-dimensional event and a quantized coefficient stream following the third two-dimensional event is allocated to a low priority hierarchy as a low priority quantized coefficient stream.

Therefore, in cases where a plurality of one-dimensional quantized coefficient streams are input to the circuit 713 one after another, pieces of visually important information (or quantized coefficients) corresponding to the lower spatial frequencies are allocated to the high priority hierarchy, and pieces of visually lesser-important information (or quantized coefficients) corresponding to the higher spatial frequencies are allocated to the low priority hierarchy.

One or more two-dimensional events of each low priority quantized coefficient stream allocated to the low priority hierarchy are respectively encoded in two-dimensional variable-length in the first two-dimensional variable-length encoding circuit 714 to produce one or more variable-length codes composing a low priority variable-length code stream. In this case, a length of a variable-length code corresponding to a two-dimensional event is shortened as an occurrence frequency of the two-dimensional event becomes higher, so that a code volume of variable-length codes produced in the circuit 714 is reduced. In general, a code having a shortened length is set as a variable-length code corresponding to a two-dimensional event as an absolute value of the level of the two-dimensional event becomes lower, and a code having a shortened length is set as a variable-length code corresponding to a two-dimensional event as the zero run length of the two-dimensional event becomes shorter. For example, the two-dimensional event Ev=(2,−2) is encoded to a variable-length code stream "00001001". Also, an EOB code "01" is added after a final two-dimensional event occurring in one one-dimensional quantized coefficient stream to indicate the end of a block. Therefore, in cases where the particular one-dimensional quantized coefficient stream is input to the priority selecting circuit 713, a particular low priority variable-length code stream "0000100110" is output from the variable-length encoding circuit 714.

Thereafter, a plurality of low priority variable-length code streams are output from the variable-length encoding circuit 714 one after another and are temporarily stored in the first code stream buffer 715 to smooth the streams in transmission speed (or bit-rate). Thereafter, a less-strong error correction code is added to each of the low priority variable-length code streams in the first error correction code adding circuit 716. For example, a Reed-Solomon code RS(64,48) in which a encoding ratio is 3/4 is used as the less-strong error correction code. Thereafter, the low priority variable-length code streams to which the less-strong error correction codes are added are output from an output terminal 717.

Also, one or more two-dimensional events of each high priority quantized coefficient stream allocated to the high priority hierarchy in the priority selecting circuit 713 are respectively encoded in two-dimensional variable-length in the second two-dimensional variable-length encoding circuit 723 to produce one or more variable-length codes composing a high priority variable-length code stream. For example, the first two-dimensional event Ev=(0,3) is encoded to "001010", and the second two-dimensional event Ev=(1,1) is encoded to "0110". Therefore, a particular high priority variable-length code stream "0010100110" is output. In this case, because the number of two-dimensional events allocated to the high priority hierarchy is determined by the priority break point, any EOB code is not added.

Thereafter, each high priority variable-length code stream output from the encoding circuit 723 is input to the multiplexing 719. Also, code stream control information composed of the priority break point encoded by the priority break point encoding circuit 718, the quantizing step encoded by the quantizing step encoding circuit 724 and the motion vector encoded by the motion vector encoding circuit 725 are input to the multiplexing 719. In the multiplexing 719, the code stream control information and one high priority variable-length code stream are multiplied to produce a multiplied variable-length code stream allocated to the high priority hierarchy. Because the code stream control information are important to correctly decoding the high priority variable-length code stream, the multiplied variable-length code stream including the code stream control information is allocated to the high priority hierarchy.

Thereafter, a plurality of multiplied variable-length code streams are output from the multiplexing 719 one after another and are temporarily stored in the second code stream buffer 720 to smooth the code streams in transmission speed (or bit-rate). Thereafter, a stronger error correction code is added to each of the multiplied variable-length code streams in the second error correction code adding circuit 721. For example, a Reed-Solomon code RS(64,32) in which a encoding ratio is 1/2 is used as the stronger error correction code. Thereafter, the multiplied variable-length code streams to which the stronger error correction codes are added are output from an output terminal 722.

Also, a quantizing step is calculated in the quantizing step control circuit 726 according to a first code volume of the low priority variable-length code streams stored in the first code stream buffer 715 and a second code volume of the multiplied variable-length code streams stored in the second code stream buffer 720 to prevent the occurrence of an underflow or overflow in the buffers 715 and 720, and the quantizing circuit 705 and the inverse quantizing circuit 706 are controlled according to the quantizing step. In cases where a sum of the first and second code volumes are too high, the quantizing step is increased to decrease the first and second code volumes. In contrast, in cases where the sum of the first and second code volumes are too low, the quantizing step is decreased to increase the first and second code volumes.

Also, a priority break point is calculated in the priority break point control circuit 727 according to the first and second code volumes to prevent the occurrence of an underflow or overflow in the buffers 715 and 720, and the priority selecting circuit 713 is controlled according to the priority break point. In cases where the first code volume of the low priority variable-length code streams is too low as compared with the second code volume of the multiplied variable-length code streams, the priority break point is increased to increase the first code volume and decrease the second code volume.

For example, the quantizing step and the priority break point are set by the control circuits 726 and 727 to set the speed (or data-rate) of the low priority variable-length code streams output from the buffer 715 to a constant value 24 kbits per second (kbps) and set the speed of the multiplied variable-length code streams output from the buffer 720 to a constant value 16 kbps. In this case, a total speed of the low priority and multiplied variable-length code streams to which the error correction codes are added reaches 64 kbps.

The low priority and multiplied variable-length code streams output from the output terminals 717 and 722 are transmitted to another apparatus or are stored. In cases where the code streams are transmitted through a radio channel, a bit error (or code error) frequently occurs on the radio channel. However, even though a bit error rate is generally no less than 1%, in cases where the occurrence of many bit errors (or code errors) at a burst is suppressed, a bit error rate can be lowered to about 0.0001% because of the addition of the RS code (64,48) for the low priority hierarchy, and a bit error rate can be lowered to about $1*10^{-12}$% because of the addition of the RS code (64,32) for the high priority hierarchy. This decrease of the bit error rate is described in a literature: Shingaku Giho (satellite communication), SAT8919, pp. 5–10, 1989.

2.2. Second Previously Proposed Art

Next, a conventional image signal decoding apparatus for decoding the low priority and multiplied variable-length code streams encoded according to the hierarchically layered coding technique with priority is described.

FIG. 3 is a block diagram of a conventional image signal decoding apparatus.

As shown in FIG. 3, a conventional image signal decoding apparatus 900 is composed of a first error correcting circuit 902 for correcting one or more errors occurring in one low priority variable-length code stream transmitted from the image signal encoding apparatus 701 according to the less-strong error correction codes added to the code stream and removing the low less-strong error correction codes from the low priority variable-length code stream, a first buffer 903 for temporarily storing the low priority variable-length code stream, a first two-dimensional variable-length code decoding circuit 908 for decoding the low priority variable-length code stream to reproduce the low priority quantized coefficient stream, a second error correcting circuit 905 for correcting one or more errors occurring in one multiplied variable-length code stream transmitted from the image signal encoding apparatus 701 according to the stronger error correction codes added to the code stream and removing the stronger error correction code from the multiplied variable-length code stream, a second buffer 906 for temporarily storing the multiplied variable-length code stream, a demultiplexing circuit 907 for dividing the multiplied variable-length code stream into the high priority variable-length code stream and the code stream control information, a second two-dimensional variable-length code decoding circuit 909 for decoding the high priority variable-length code stream to reproduce the high priority quantized coefficient stream, a priority break point decoding circuit 910 for decoding the encoded priority break point included in the code stream control information to reproduce the priority break point, a quantizing step decoding circuit 911 for decoding the encoded quantizing step included in the code stream control information to reproduce the quantizing step, a motion vector decoding circuit 912 for decoding the encoded motion vector included in the code stream control information to reproduce the motion vector, a priority deselecting circuit 913 for deselecting the reproduced low priority quantized coefficient stream produced by the decoding circuit 908 and the reproduced high priority quantized coefficient stream produced by the decoding circuit 909 according to the priority break point to reproduce the one-dimensional quantized coefficient stream, a inverse scanning circuit 914 for inversely scanning the reproduced one-dimensional quantized coefficient stream to reproduce the quantized coefficient block, a inverse quantizing circuit 915 for inversely quantizing the reconstructed quantized coefficient block according to the reproduced motion vector to reproduce the coefficient block, a inverse orthogonal transforming circuit 916 for inversely orthogonal-transforming the coefficient block to reproduce the predicted error block, a frame memory 918 for storing a reconstructed preceding frame, a motion compensating circuit 919 for extracting a block from the reconstructed preceding frame according to the reproduced motion vector and outputting the extracted block as a predicted block for a reconstructed current block, an adding circuit 917 for adding the predicted error block and the predicted block to obtain the reconstructed current block and storing the reconstructed current block in the frame memory 918, and a frame reconstructing circuit 920 for reconstructing the current frame from a plurality of reconstructed blocks respectively transmitted from the adding circuit 917 as the reconstructed current block.

In the above configuration, when a plurality of low priority variable-length code streams allocated to the low priority hierarchy are input to the first error correcting circuit 902 one after another, one or more errors occurring in each of the low priority variable-length code streams are corrected, and the error correction code is removed from each of the low priority variable-length code streams. Thereafter, each of the low priority variable-length code streams is input to the first two-dimensional variable-length code decoding circuit 908 through the first buffer 903. In the circuit 908, variable-length codes of one low priority variable-length code stream are decoded to one or more two-dimensional events, and a quantized coefficient stream corresponding to the two-dimensional events is output as a reproduced low priority quantized coefficient stream. For example, in cases where the particular low priority variable-length code stream "0000100110" is input to the circuit 908, a variable-length code stream "00001001" is decoded to the two-dimensional event Ev=(2,-2), and the EOB code "10" is decoded to an EOB sign. Thereafter, a quantized coefficient stream {0,0,-2,0,0, - - - , 0,0} is reproduced from the two-dimensional event Ev=(2,-2) and the EOB sign. Therefore, the reproduced low priority quantized coefficient stream which is allocated to the low priority hierarchy and corresponds to one quantized coefficient block can be output because the EOB code is included in the low priority variable-length code stream.

In contrast, when a plurality of multiplied variable-length code streams allocated to the high priority hierarchy are input to the second error correcting circuit 905 one after another, one or more errors occurring in each of the multiplied variable-length code streams are corrected, and the error correction code is removed from each of the multiplied variable-length code streams. Thereafter, each of the multiplied variable-length code streams is input to the demultiplexing circuit 907 through the second buffer 906. In the circuit 907, one multiplied variable-length code stream is divided into one high priority variable-length code stream, one encoded priority break point, one encoded quantizing step and one encoded motion vector. The high priority variable-length code stream is decoded to a reproduced high priority quantized coefficient stream in the second two-dimensional variable-length code decoding circuit 909. For example, the particular high priority variable-length code stream "0010100110" input to the circuit 909 is decoded to, a reproduced high priority quantized coefficient stream {3,0,1}. Because any EOB code is not included in the high priority variable-length code stream, a plurality of reproduced high priority quantized coefficient streams are successively output from the circuit 909 as a successive quantized coefficient stream when a plurality of high priority variable-length code streams are input to the circuit 909 one after another.

The encoded priority break point is decoded to a reproduced priority break point in the priority break point decoding circuit 910, the encoded quantizing step is decoded to a reproduced quantizing step in the quantizing step decoding circuit 911, and the decoded motion vector is decoded to a reproduced motion vector in the motion vector decoding circuit 912.

Thereafter, the reproduced low priority quantized coefficient stream output from the circuit 908 and the reproduced high priority quantized coefficient stream output from the circuit 909 are combined to a reproduced one-dimensional quantized coefficient stream according to the reproduced priority break point in the priority deselecting circuit 913. For example, in cases where the reproduced priority break point indicates 2, two quantized coefficient streams {3} and {0,1} corresponding to two two-dimensional events (0,3) and (1,1) are extracted from a head portion of the successive quantized coefficient stream output from the circuit 909 to obtain the-reproduced high priority quantized coefficient stream {3,0,1}, and the reproduced low priority quantized coefficient stream {0,0,-2,0,0, - - - , 0,0} is connected to a rear end of the reproduced high priority quantized coefficient stream. Therefore, a reproduced one-dimensional quantized coefficient stream {3,0,1,0,0,-2,0,0, - - - , 0,0} corresponding to one quantized coefficient block can be obtained. In this case, the number of coefficients in the reproduced one-dimensional quantized coefficient stream is 64.

In cases where an error of which the correction is impossible is detected in the error correcting circuit 902, a zero-valued code stream is connected to a rear end of the reproduced high priority quantized coefficient stream in the deselecting circuit 913. For example, a reproduced one-dimensional quantized coefficient stream {3,0,1,0,0, - - - , 0,0} is output by arranging the zero-valued code stream after the reproduced quantized coefficient stream {3,0,1}.

A plurality of quantized coefficients of the reproduced one-dimensional quantized coefficient stream output from the deselecting circuit 913 are, as shown in FIG. 2, rearranged in two-dimension in the inverse scanning circuit 914 to obtain a reconstructed quantized coefficient block composed of 8*8 quantized coefficients. Thereafter, the reconstructed quantized coefficient block is inversely quantized in the inverse quantizing circuit 915 according to the reproduced quantizing step to obtain a reconstructed coefficient block. Thereafter, the reconstructed coefficient block is inversely orthogonal-transformed in the inverse orthogonal transforming circuit 916 to obtain a reconstructed predicted error block.

Also, in the motion compensating circuit 919, a block indicated by the reproduced motion vector is extracted from the reproduced preceding frame stored in the frame memory 918, and the block is output to the adding circuit 917 as a predicted block for a reproduced current frame. In the adding circuit 917, pixel values of the reconstructed predicted error block are added to those of the predicted block in one-to-one correspondence, and a reconstructed current block is produced. Therefore, a plurality of reconstructed blocks of a reconstructed current frame are produced in the adding circuit 917 one after another, and the reconstructed blocks of the reconstructed current frame are stored in the frame memory 918 to be used for the prediction of a reconstructed succeeding frame. Also, the reconstructed current blocks of the reconstructed current frame are input to the frame reconstructing circuit 920 one after another, and the reconstructed current frame is obtained. The reconstructed current frame is output from an output terminal 921.

Accordingly, because the visually important image information (or the visually important image signal) corresponding to the lower spatial frequencies and the code stream control information required to perform a correct decoding operation in the conventional picture signal decoding apparatus 900 are allocated to the high priority hierarchy in the conventional picture signal encoding apparatus 701, the visually important image information and the code stream control information can be correctly reproduced in the decoding apparatus 900, and the deterioration of a quality of a reproduced image can be suppressed. Also, because the addition of the stronger error correction codes is limited to the visually important image information and the code stream control information allocated to the high priority hierarchy, the increase of the code volume is suppressed, and a transmission efficiency and a storing efficiency for the image information can be heightened. Also, it is applicable that the priority break point be decreased to reduce the second code volume for the high priority hierarchy. In this case, the transmission efficiency and the storing efficiency can be moreover heightened.

2.3. Problem to be Solved by the Invention

However, though one or more non-zero quantized coefficients corresponding to some lower spatial frequencies indicated by the priority break point are allocated to the high priority hierarchy to suppress the occurrence of one or more errors in the transmission or storage of the non-zero quantized coefficients corresponding to some lower spatial frequencies, non-zero quantized coefficients corresponding to high spatial frequencies are not allocated to the high priority hierarchy even though the non-zero quantized coefficients corresponding to the high spatial frequencies greatly influence a reproduced image quality because of high absolute values of the non-zero quantized coefficients corresponding to the high spatial frequencies. In particular, in cases where the motion estimation or the prediction of a current frame is not preferably performed, a quantized coefficient corresponding to a high spatial frequency has a high absolute value. In this case, because the quantized coefficient having the high absolute value is allocated to the low priority hierarchy, there is a high probability that the quantized coefficient is lost during the transmission or storage of the quantized coefficient. Therefore, the quality of the reproduced image considerably deteriorates.

Also, in cases where one or more non-zero quantized coefficients corresponding to lower spatial frequencies have low absolute values, even though the non-zero quantized coefficients are lost, the quality of the reproduced image does not deteriorate so much. However, the non-zero quantized coefficients are allocated to the high priority hierarchy in the priority selecting circuit 713 until the number of non-zero quantized coefficients reaches the priority break point. Therefore, the ratio of the quantized coefficients allocated to the high priority hierarchy to all quantized coefficients output from the scanning circuit 713 cannot be reduced, and the improvement of the transmission efficiency and storing efficiency is not enough in the conventional picture signal encoding apparatus 701.

Also, in cases where one or more errors occurring in one variable-length code stream during the transmission or storage of the variable-length code stream are not corrected in the error correcting circuit 902 or 905 of the conventional image signal decoding apparatus 900, even though the variable-length decoding operation is performed for the variable-length code stream having the errors, one reproduced quantized coefficient stream having errors is obtained, and a quality of a reproduced image considerably deteriorates. An example that an error not corrected in the decoding apparatus 900 occurs in one variable-length code stream is described.

A quantized coefficient stream {3,0,1,−1,0,−2,−1,0,0,0,0, - - - , 0} is produced in the scanning circuit 712 of the encoding apparatus 701. The quantized coefficient stream corresponds to a series of two-dimensional events (0, 3), (1,1), (0,−1), (1,−2), (0,−1) EOB. When the quantized coefficient stream is transformed in the encoding circuits 714 and 723, a variable-length code stream "001010 0110 111 0001101 111 10" is output from the output terminals 717 and 722. In cases where a code "0" of the fourth bit is erroneously changed to "1", an erred variable-length code stream "001110 0110 111 0001101 111 10" is received by the decoding apparatus 900, and the error of the fourth bit is not corrected in the error correcting circuit 902 or 905. The erred variable-length code stream corresponds to a series of two-dimensional events (3,1), (1,1), (0,−1), (1,−2), (0,−1) EOB. When the erred variable-length code stream is decoded in the decoding circuits 908 and 909, a reproduced quantized coefficient stream {0,0,0,1,0,1,−1,0,−2,−1,0, - - - , 0} is obtained. Therefore, the first, third, fourth, sixth, ninth and tenth quantized coefficients of the reproduced quantized coefficient stream are erroneously changed as compared with those of the quantized coefficient stream.

Therefore, a variable-length code stream having one or more bit errors (or code errors) is input to the decoding circuit 908 or 909, a reproduced quantized coefficient stream having errors is obtained, and a reproduced image is obtained according to the reproduced quantized coefficient stream having errors. As a result, a difference between an original image and the produced image is generated. Because the reproduced image is used for the prediction of a succeeding frame, the adverse influence of the erroneous image reproduction is exerted in a time direction, and a quality of the reproduced image considerably deteriorates.

Also, in cases where the error checking and correction is strongly performed to greatly reduce the transmission error or storing error, the volume of the error correction codes is increased, the code efficiency for the image signal is considerably decreased.

SUMMARY OF THE INVENTION

An object of the present invention is to provide, with due consideration to the drawbacks of such a conventional image signal encoding apparatus and a conventional image signal decoding apparatus, an image signal encoding apparatus in which an image signal is encoded to one or more variable-length code streams at a high code efficiency while heightening a transmission or storing efficient for the image signal on condition that the transmission or storage of one or more codes of the streams strongly influencing a quality of a reproduced image is performed at an extremely low bit error ratio and an image signal decoding apparatus in which one or more code errors occurring in the codes of the streams are reliably corrected in a simplified configuration to obtain a reproduced image having a superior image quality.

The object is achieved by the provision of an image signal encoding apparatus comprising:

block extracting means for extracting a plurality of blocks respectively composed of a plurality of pixels one after another from a digital image signal;

quantized coefficient producing means for producing a one-dimensional quantized coefficient stream composed of a plurality of quantized coefficients from each block extracted by the block extracting means;

priority hierarchy encoding means for extracting one or more important quantized coefficients of which absolute values are higher than a threshold value from the quantized coefficients of the one-dimensional quantized coefficient stream produced by the quantized coefficient producing means and encoding the important quantized coefficients to produce a high priority code stream; and low priority hierarchy encoding means for extracting one or more lesser-important quantized coefficients of which absolute values are equal to or lower than the threshold value from the quantized coefficients of the one-dimensional quantized coefficient stream produced by the quantized coefficient producing means and encoding the lesser-important quantized coefficients to produce a low priority code stream.

In the above configuration, a plurality of blocks are extracted from a digital image signal by the block extracting means, and a quantized coefficient stream composed of a plurality of quantized coefficients is produced from each block by the quantized coefficient producing means. In this case, one quantized coefficient of which an absolute value is high greatly influences a quality of a reproduced image even though the quantized coefficient corresponds to a high spatial frequency, and one quantized coefficient of which an absolute value is sufficiently low hardly influences a quality of the reproduced image even though the quantized coefficient corresponds to a low spatial frequency.

Therefore, one or more important quantized coefficients of which absolute values are higher than a threshold value are extracted from the quantized coefficients of the quantized coefficient stream, a high priority code stream is produced from the important quantized coefficients in the priority hierarchy encoding means.

It is preferred that the image signal encoding apparatus further comprise high priority error correction code adding means for adding one or more stronger error correction codes to the high priority code stream produced by the high priority hierarchy encoding means; and low priority error correction code adding means for adding one or more less-strong error correction codes to the low priority code stream produced by the low priority hierarchy encoding means. Because one or more stronger error correction codes are added to the high priority code stream by the high priority error correction code adding means, even though one or more code errors occur in the high priority code stream, the code errors can be reliably corrected in an image signal decoding apparatus.

Accordingly, because the transmission or storage of one or more codes of the high priority code streams strongly influencing a quality of a reproduced image is performed at an extremely low bit error ratio, a reproduced image having a superior quality can be obtained in a decoding apparatus.

Also, one or more lesser-important quantized coefficients of which absolute values are equal to or lower than the threshold value are extracted from the quantized coefficients of the quantized coefficient stream, a low priority code stream is produced from the lesser-important quantized coefficients in the low priority hierarchy encoding means, and one or more less-strong error correction codes are added to the low priority code stream by the low priority error correction code adding means. Because of the addition of the less-strong error correction codes, the increase of codes caused by the addition of the less-strong error correction codes is suppressed, and a code efficiency for the high priority and low priority code streams can be heightened. Accordingly, an image signal can be encoded at a high code efficiency while heightening a transmission or storing efficient for the image signal.

Also, the object is achieved by the provision of an image signal decoding apparatus for reproducing an image signal transformed into a plurality of one-dimensional quantized coefficient streams which each are composed of an important quantized coefficient stream composed of one or more important quantized coefficients of which absolute values are higher than a threshold value and one or more zero-valued quantized coefficients and a lesser-important quantized coefficient stream composed of one or more lesser-important quantized coefficients of which absolute values are equal to or lower than the threshold value, comprising:

demultiplexing means for dividing a high priority code stream, which is obtained by encoding both the threshold value and a subtracted quantized coefficient stream composed of one or more subtracted quantized coefficients and one or more zero-valued quantized coefficients, into an encoded subtracted quantized coefficient stream and an encoded threshold value, each of the subtracted quantized coefficients being obtained by subtracting the threshold value from one important quantized coefficient of one important quantized coefficient stream;

priority hierarchy decoding means for decoding the encoded subtracted quantized coefficient stream demultiplexed by the demultiplexing means to reproduce the subtracted quantized coefficient stream;

threshold value decoding means for decoding the encoded threshold value demultiplexed by the demultiplexing means to reproduce the threshold value;

threshold value adding means for adding the threshold value decoded by the threshold value decoding means to each of the subtracted quantized coefficients of the subtracted quantized coefficient stream decoded by the priority hierarchy decoding means to reproduce one important quantized coefficient stream;

low priority hierarchy decoding means for decoding a low priority code stream, which is obtained by encoding each of the lesser-important quantized coefficient streams, to reproduce one lesser-important quantized coefficient stream;

quantized coefficient stream combining means for combining the important quantized coefficient stream reproduced by the threshold value adding means and the lesser-important quantized coefficient stream reproduced by the low priority hierarchy decoding means to reproduce one one-dimensional quantized coefficient stream; and image signal reproducing means for reproducing the image signal from the one-dimensional quantized coefficient streams reproduced one after another by the quantized coefficient stream combining means.

It is preferred that the image signal decoding apparatus further comprising:

high priority error correcting means for correcting one or more first code errors occurring in the high priority code stream according to one or more stronger error correction codes added to the high priority code stream, the high priority code stream of which the first code errors are corrected being demultiplexed by the demultiplexing means; and low priority error correcting means for correcting one or more second code errors occurring in the low priority code stream according to one or more less-strong error correction codes added to the low priority code stream, the low priority code stream of which the second code errors are corrected being decoded by the low priority hierarchy decoding means.

In the above configuration, a plurality of sets of high priority code streams and low priority code streams are transmitted from an image signal encoding apparatus to the image signal decoding apparatus. In this case, one or more first code errors occur in each high priority code stream at some probability, and one or more second code errors occur in each low priority code stream at some probability. The first code errors are corrected in the high priority error correcting means according to one or more stronger error correction codes added to the high priority code stream, and the second code errors are corrected in the low priority error correcting means according to one or more less-strong error correction codes added to the high priority code stream. In this case, because a code ratio of the stronger error correction codes to one high priority code stream is higher than another code ratio of the less-strong error correction codes to one low priority code stream, the first code errors can be more reliably corrected as compared with the correction of the second code errors.

Thereafter, each high priority code stream is divided into an encoded subtracted quantized coefficient stream and an encoded threshold value. The encoded subtracted quantized coefficient stream is decoded by the priority hierarchy decoding means to reproduce the subtracted quantized coefficient stream, the encoded threshold value is decoded by the threshold value decoding means to reproduce the threshold value, the threshold value is added to each of subtracted quantized coefficients of the subtracted quantized coefficient stream by the threshold value adding means to reproduce one important quantized coefficient stream. Also, each low priority code stream is decoded by the low priority hierarchy decoding means to reproduce one lesser-important quantized coefficient stream.

Thereafter, the important quantized coefficient stream and the lesser-important quantized coefficient stream are combined by the quantized coefficient stream combining means to reproduce one one-dimensional quantized coefficient stream, and an image signal is reproduced by the image signal reproducing means from the one-dimensional quantized coefficient streams transmitted one after another from the quantized coefficient stream combining means.

Accordingly, even though a plurality of high priority code streams respectively obtained by encoding one important quantized coefficient stream in which absolute values of one or more important quantized coefficients are higher than the threshold value and a plurality of low priority code streams respectively obtained by encoding one lesser-important quantized coefficient stream in which absolute values of one or more lesser-important quantized coefficients are equal to or lower than the threshold value are transmitted to the signal image decoding apparatus one after another, an image having a superior image quality can be reproduced in a simplified configuration because the first code errors occurring in the high priority code streams obtained by encoding the subtracted quantized coefficient streams relating to the important quantized coefficient streams are corrected according to the stronger error correction codes.

Also, even though a plurality of subtracted quantized coefficient streams are encoded one after another in the signal image encoding apparatus in place of the important quantized coefficient streams to heighten a code efficiency, because the threshold value is added to each of the subtracted quantized coefficients of the subtracted quantized coefficient streams to reproduce the important quantized coefficient streams, the image signal can be reliably reproduced, and a code efficiency can be heightened.

Also, the object is achieved by the provision of an image signal decoding apparatus for reproducing an image signal transformed into a plurality of one-dimensional quantized coefficient streams which each are composed of an important quantized coefficient stream composed of one or more important quantized coefficients of which absolute values are higher than a threshold value and one or more zero-valued quantized coefficients and a lesser-important quantized coefficient stream composed of one or more lesser-important quantized coefficients of which absolute values are equal to or lower than the threshold value, comprising:

priority hierarchy decoding means for decoding a high priority code stream, which is obtained by encoding each of the important quantized coefficient streams, to reproduce one important quantized coefficient stream and producing one or more pieces of positional information indicating one or more particular positions of the important quantized coefficients of the important quantized coefficient stream;

low priority hierarchy decoding means for decoding a low priority code stream, which is obtained by encoding a shortened lesser-important quantized coefficient stream composed of one or more shortened lesser-important quantized coefficients, to reproduce one shortened lesser-important quantized coefficient stream, each of the shortened lesser-important quantized coefficients being obtained by removing all important quantized coefficients from one one-dimensional quantized coefficient stream while other lesser-important quantized coefficients of the one-dimensional quantized coefficient stream are arranged close together in that order;

lesser-important stream producing means for inserting one or more particular zero-valued quantized coefficients into the shortened lesser-important quantized coefficient stream reproduced by the low priority hierarchy decoding means according to the positional information produced by the priority hierarchy decoding means to reproduce one lesser-important quantized coefficient stream in which the particular zero-valued quantized coefficients are positioned at the particular positions indicated by the positional information as one or more lesser-important quantized coefficients and the number of lesser-important quantized coefficients of the lesser-important quantized coefficient stream is the same as that of the important quantized coefficient stream reproduced by the priority hierarchy decoding means;

quantized coefficient stream combining means for combining the important quantized coefficient stream reproduced by the priority hierarchy decoding means and the lesser-important quantized coefficient stream reproduced by the lesser-important stream producing means to reproduce one one-dimensional quantized coefficient stream; and image signal reproducing means for reproducing the image signal from the one-dimensional quantized coefficient streams reproduced one after another by the quantized coefficient stream combining means.

In the above configuration, a plurality of shortened lesser-important quantized coefficient streams are encoded to a plurality of low priority code streams one after another in a signal image encoding apparatus in place of a plurality of lesser-important quantized coefficient streams to heighten a code efficiency. Therefore, after one or more code errors occurring in each low priority code stream are corrected and each low priority code stream is decoded to one shortened lesser-important quantized coefficient stream, one or more particular zero-valued quantized coefficients are inserted into the shortened lesser-important quantized coefficient stream by the lesser-important stream producing means to reproduce one lesser-important quantized coefficient stream. In this case, the particular zero-valued quantized coefficients are positioned at one or more particular positions indicated by the positional information produced by the priority hierarchy decoding means as one or more lesser-important quantized coefficients, and the number of lesser-important quantized coefficients of the lesser-important quantized coefficient stream is the same as that of one important quantized coefficient stream.

Also, one important quantized coefficient stream is reproduced by the priority hierarchy decoding means, and the important quantized coefficient stream and the lesser-important quantized coefficient stream are combined by the quantized coefficient stream combining means, and one one-dimensional quantized coefficient stream is reproduced.

It is preferred that the image signal decoding apparatus further comprising:

high priority error correcting means for correcting one or more first code errors occurring in the high priority code stream according to one or more stronger error correction codes added to the high priority code stream, the high priority code stream of which the first code errors are corrected being decoded by the priority hierarchy decoding means; and low priority error correcting means for correcting one or more second code errors occurring in the low priority code stream according to one or more less-strong error correction codes added to the low priority code stream, the low priority code stream of which the second code errors are corrected being decoded by the low priority hierarchy decoding means.

Because the first code errors occurring in each high priority code stream obtained by encoding each important quantized coefficient stream are corrected according to the stronger error correction codes, an image having a superior image quality can be reproduced in a simplified configuration. Also, a code efficiency can be heightened because the low priority code streams relating to the shortened lesser-important quantized coefficient streams are decoded.

Also, the object is achieved by the provision of an image signal decoding apparatus for reproducing an image signal transformed into a plurality of one-dimensional quantized coefficient streams which each are composed of an important quantized coefficient stream composed of one or more important quantized coefficients of which absolute values are higher than a threshold value and one or more zero-valued quantized coefficients and a lesser-important quantized coefficient stream composed of one or more lesser-important quantized coefficients of which absolute values are equal to or lower than the threshold value, comprising:

demultiplexing means for dividing a high priority code stream, which is obtained by encoding both the threshold value and one important quantized coefficient stream, into an encoded important quantized coefficient stream and an encoded threshold value;

priority hierarchy decoding means for decoding the encoded important quantized coefficient stream demultiplexed by the demultiplexing means to reproduce one important quantized coefficient stream;

threshold value decoding means for decoding the encoded threshold value demultiplexed by the demultiplexing means to reproduce the threshold value;

low priority hierarchy decoding means for decoding a low priority code stream, which is obtained by encoding each of the lesser-important quantized coefficient streams, to reproduce one lesser-important quantized coefficient stream;

coefficient value comparing and judging means for judging whether each absolute value of the lesser-important quantized coefficients of the lesser-important quantized coefficient stream reproduced by the low priority hierarchy decoding means is higher than the threshold value decoded by the threshold value decoding means;

coefficient stream replacing means for replacing the lesser-important quantized coefficient stream reproduced by the low priority hierarchy decoding means with a meaningless quantized coefficient stream to output the meaningless quantized coefficient stream in cases where it is judged by the coefficient value comparing and judging means that one absolute value of one lesser-important quantized coefficient of the lesser-important quantized coefficient stream is higher than the threshold value and outputting the lesser-important quantized coefficient stream in cases where it is judged by the coefficient value comparing and judging means that the absolute values of all lesser-important quantized coefficients of the lesser-important quantized coefficient stream are equal to or lower than the threshold value;

quantized coefficient stream combining means for combining the important quantized coefficient stream reproduced by the priority hierarchy decoding means and the lesser-important quantized coefficient stream or the meaningless quantized coefficient stream output from the coefficient stream replacing means to reproduce one one-dimensional quantized coefficient stream; and image signal reproducing means for reproducing the image signal from the one-dimensional quantized coefficient streams reproduced one after another by the quantized coefficient stream combining means.

It is preferred that the image signal decoding apparatus further comprising:

high priority error correcting means for correcting one or more first code errors occurring in the high priority code stream according to one or more stronger error correction codes added to the high priority code stream, the high priority code stream of which the first code errors are corrected being demultiplexed by the demultiplexing means; and low priority error correcting means for correcting one or more second code errors occurring in the low priority code stream according to one or more less-strong error correction codes added to the low priority code stream, the low priority code stream of which the second code errors are corrected being decoded by the low priority hierarchy decoding means.

In the above configuration, even though the correction of one or more second code errors occurring in each of low priority code streams transmitted from an image signal encoding apparatus is performed by the high priority error correcting means, because the correction for each low priority code stream is performed according to one or more less-strong error correction codes added to the low priority code stream, there is a probability that one or more second code errors still remain in one or more low priority code streams and each low priority code stream having the second errors is decoded to a lesser-important quantized coefficient stream. In cases where any second error does not remain in a low priority code stream, each absolute value of one or more lesser-important quantized coefficients in a lesser-important quantized coefficient stream reproduced from the low priority code stream is necessarily equal to or lower than the threshold value. In contrast, in cases where one or more second code errors remain in a particular low priority code stream, an absolute value of a particular lesser-important quantized coefficient of a particular lesser-important quantized coefficient stream reproduced from the particular low priority code stream becomes generally higher than the threshold value.

Therefore, in cases where it is judged by the coefficient value comparing and judging means that one absolute value of one lesser-important quantized coefficient of the lesser-important quantized coefficient stream reproduced by the low priority hierarchy decoding means is higher than the threshold value, a meaningless quantized coefficient stream is output from the coefficient stream replacing means in place of the particular lesser-important quantized coefficient stream.

Thereafter, one important quantized coefficient stream and the meaningless quantized coefficient stream are combined by the quantized coefficient stream combining means to reproduce one one-dimensional quantized coefficient stream.

Accordingly, when a plurality of low priority code streams slightly influencing the reproduction of a signal image and a plurality of high priority code streams greatly influencing the reproduction of the signal image are transmitted to the image signal decoding apparatus to reproduce an image having a superior quality at a high code efficiency, even though one or more second code errors remain in the particular low priority code stream, because the meaningless quantized coefficient stream is output from the coefficient stream replacing means in place of the particular lesser-important quantized coefficient stream reproduced from the particular low priority code stream, the reproduction of the image having a superior quality can be maintained.

Also, the object is achieved by the provision of an image signal decoding apparatus for reproducing an image signal transformed into a plurality of one-dimensional quantized coefficient streams which each are composed of an important quantized coefficient stream composed of one or more important quantized coefficients of which absolute values are higher than a threshold value and one or more zero-valued quantized coefficients and a lesser-important quantized coefficient stream composed of one or more lesser-important quantized coefficients of which absolute values are equal to or lower than the threshold value, comprising:

priority hierarchy decoding means for decoding a high priority code stream, which is obtained by encoding each of the important quantized coefficient streams, to reproduce one important quantized coefficient stream;

low priority hierarchy decoding means for decoding a low priority code stream, which is obtained by encoding each of the lesser-important quantized coefficient streams, to reproduce one lesser-important quantized coefficient stream;

non-zero-valued coefficient judging means for judging whether or not one non-zero-valued lesser-important quantized coefficient of the lesser-important quantized coefficient stream reproduced by the low priority hierarchy decoding means is placed at the same position as that at which one non-zero-valued important quantized coefficient of the important quantized coefficient stream reproduced by the priority hierarchy decoding means is placed, coefficient stream replacing means for replacing the lesser-important quantized coefficient stream reproduced by the low priority hierarchy decoding means with a meaningless quantized coefficient stream to output the meaningless quantized coefficient stream in cases where it is judged by the non-zero-valued coefficient judging means that one non-zero-valued lesser-important quantized coefficient of the lesser-important quantized coefficient stream reproduced by the low priority hierarchy decoding means is placed at the same position as that at which one non-zero-valued important quantized coefficient of the important quantized coefficient stream reproduced by the priority hierarchy decoding means is placed and outputting the lesser-important quantized coefficient stream in cases where it is judged by the non-zero-valued coefficient judging means that any of one or more non-zero-valued lesser-important quantized coefficients of the lesser-important quantized coefficient stream reproduced by the low priority hierarchy decoding means is not placed at one of one or more positions at which all of one or more non-zero-valued important quantized coefficients of the important quantized coefficient stream reproduced by the priority hierarchy decoding means are placed;

quantized coefficient stream combining means for combining the important quantized coefficient stream reproduced by the priority hierarchy decoding means and the lesser-important quantized coefficient stream or the meaningless quantized coefficient stream output from the coefficient stream replacing means to reproduce one one-dimensional quantized coefficient stream; and image signal reproducing means for reproducing the image signal from the one-dimensional quantized coefficient streams reproduced one after another by the quantized coefficient stream combining means.

It is preferred that the image signal decoding apparatus further comprising:

high priority error correcting means for correcting one or more first code errors occurring in the high priority code stream according to one or more stronger error correction codes added to the high priority code stream, the high priority code stream of which the first code errors are corrected being decoded by the priority hierarchy decoding means; and low priority error correcting means for correcting one or more second code errors occurring in the low priority code stream according to one or more less-strong error correction codes added to the low priority code stream, the low priority code stream of which the second code errors are corrected being decoded by the low priority hierarchy decoding means.

In the above configuration, even though the correction of one or more second code errors occurring in each of low priority code streams transmitted from an image signal encoding apparatus is performed by the high priority error correcting means, there is a probability that one or more second code errors still remain in one or more low priority code streams and each low priority code stream having the second errors is decoded to a lesser-important quantized coefficient stream.

In cases where any second error does not remain in a low priority code stream, any of one or more non-zero-valued lesser-important quantized coefficients of a lesser-important quantized coefficient stream reproduced from the low priority code stream is not placed at one of one or more positions at which all of one or more non-zero-valued important quantized coefficients of a corresponding important quantized coefficient stream are placed. In contrast, in cases where one or more second code errors remain in a particular low priority code stream, one non-zero-valued lesser-important quantized coefficient of a particular lesser-important quantized coefficient stream reproduced from the particular low priority code stream is generally placed at the same position as that at which one non-zero-valued important quantized coefficient of a particular important quantized coefficient stream corresponding to the particular lesser-important quantized coefficient stream is placed.

Therefore, in cases where it is judged by the non-zero-valued coefficient judging means that one non-zero-valued lesser-important quantized coefficient of the lesser-important quantized coefficient stream reproduced by the low priority hierarchy decoding means is placed at the same position as that at which one non-zero-valued important quantized coefficient of the important quantized coefficient stream reproduced by the priority hierarchy decoding means is placed, a meaningless quantized coefficient stream is output from the coefficient stream replacing means in place of the particular lesser-important quantized coefficient stream.

Accordingly, when a plurality of low priority code streams slightly influencing the reproduction of a signal image and a plurality of high priority code streams greatly influencing the reproduction of the signal image are transmitted to the image signal decoding apparatus to reproduce an image having a superior quality at a high code efficiency, even though one or more second code errors remain in the particular low priority code stream, because the meaningless quantized coefficient stream is output from the coefficient stream replacing means in place of the particular lesser-important quantized coefficient stream reproduced from the particular low priority code stream, the reproduction of the image having a superior quality can be maintained.

BRIEF DESCRIPTION OF THE DRAWINGS

The objects, features and advantages of the present invention will be apparent from the following description taken in conjunction with the accompanying drawings, in which.

DETAIL DESCRIPTION OF THE EMBODIMENTS

Preferred embodiments of an image signal encoding apparatus and an image signal decoding apparatus according to the present invention are described with reference to drawings.

Figure 4:
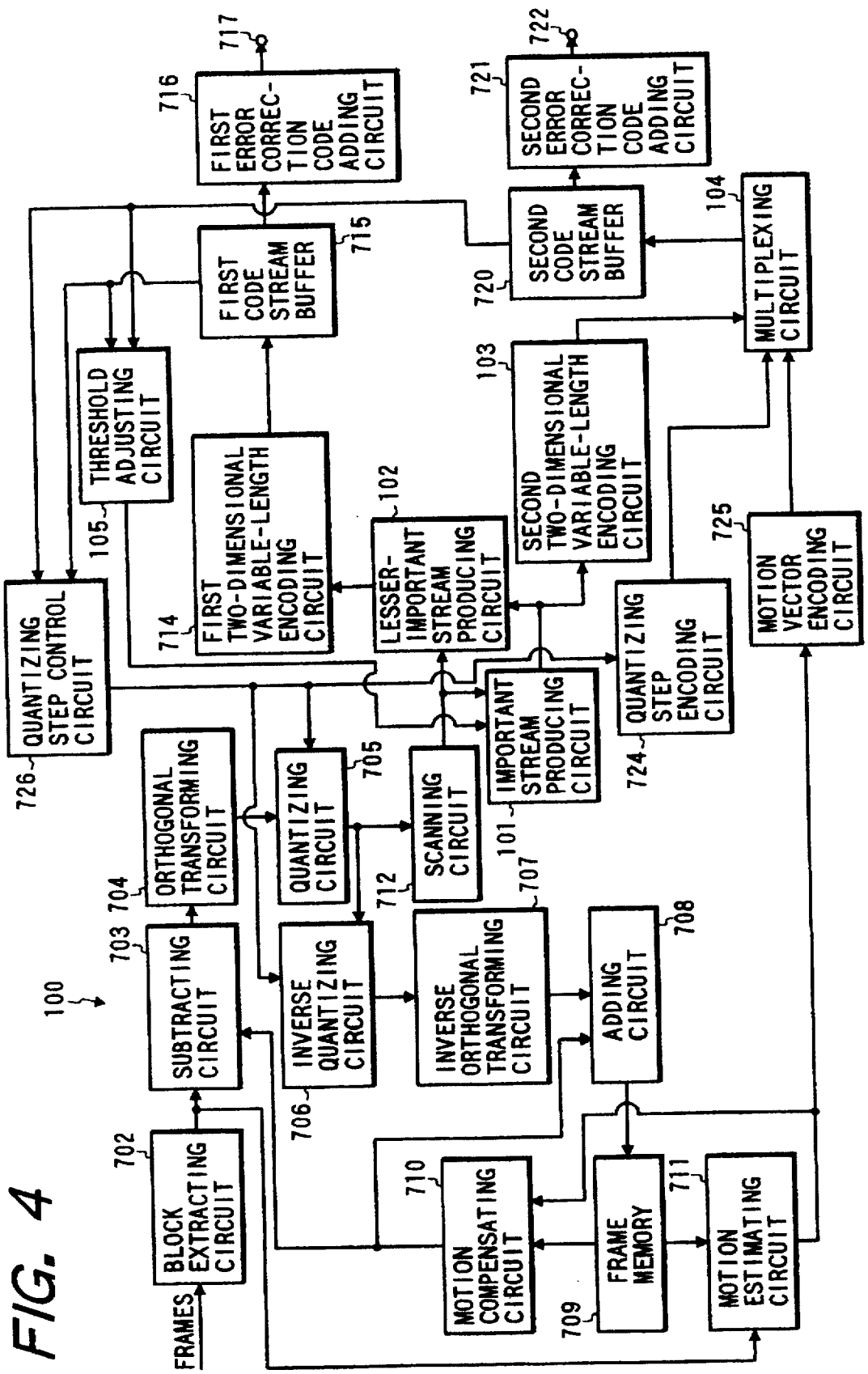
FIG. 4 is a block diagram of an image signal encoding apparatus according to a first embodiment of the present invention.
Figure 5:
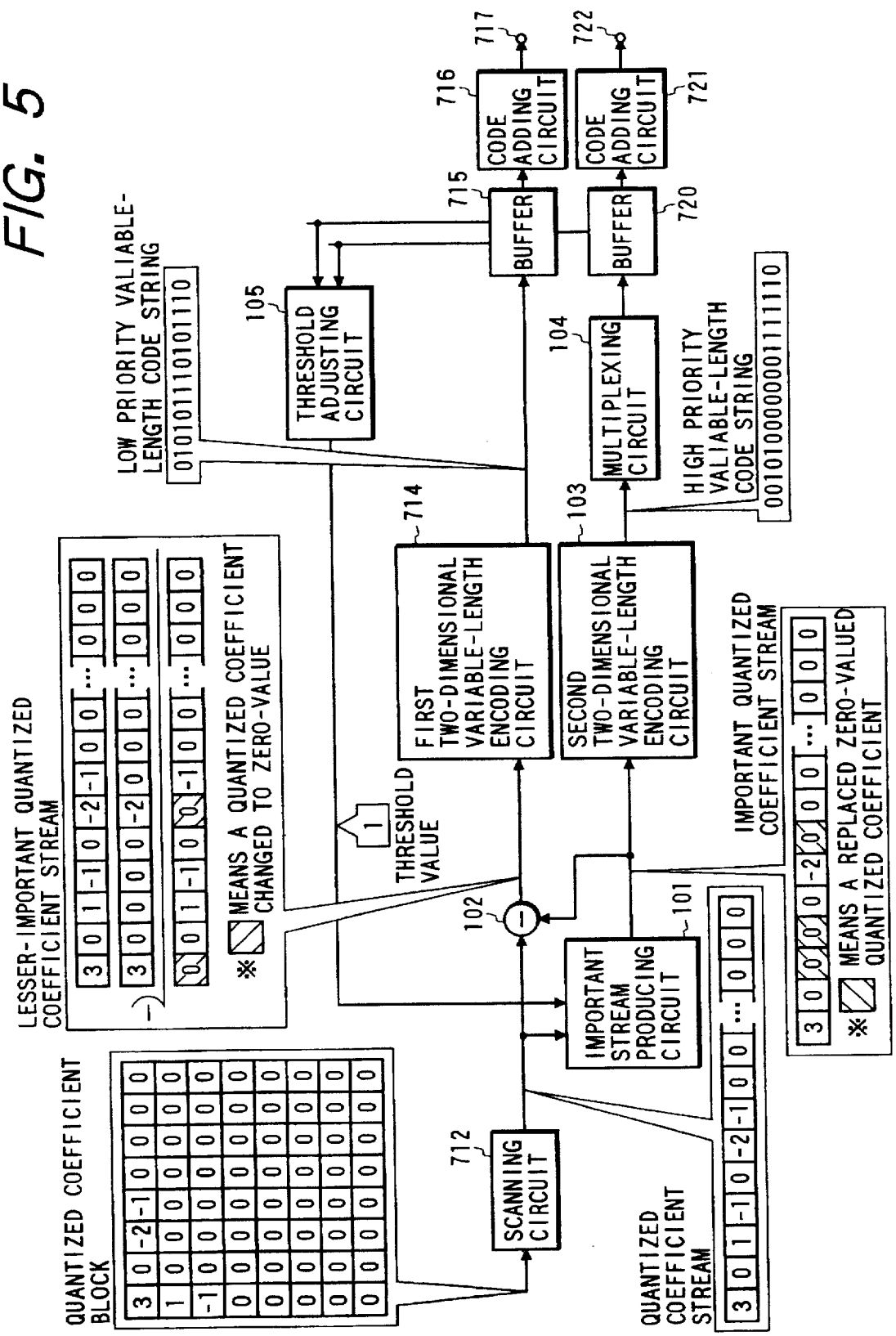
FIG. 5 is an explanatory view of an operation performed in the image signal encoding apparatus shown in FIG. 4.

FIG. 4 is a block diagram of an image signal encoding apparatus according to a first embodiment of the present invention. FIG. 5 is an explanatory view of an operation performed in the image signal encoding apparatus shown in FIG. 4.

As shown in FIG. 4, an image signal encoding apparatus 100 comprises the block extracting circuit 702, the subtracting circuit 703, the orthogonal transforming circuit 704, the quantizing circuit 705, the inverse quantizing circuit 706, the inverse orthogonal transforming circuit 707, the adding circuit 708, the frame memory 709, the motion compensating circuit 710, the motion estimating circuit 711, the scanning circuit 712,

- an important stream producing circuit 101 for extracting one or more important quantized coefficients, of which absolute values are higher than a threshold value, from the one-dimensional quantized coefficient stream produced in the scanning circuit 712 and producing an important one-dimensional quantized coefficient stream from the important quantized coefficients while adding one or more zero-valued quantized coefficients on condition that an arranged order of each important quantized coefficient in the important one-dimensional quantized coefficient stream agrees with that in the one-dimensional quantized coefficient stream and the number of quantized coefficients in the important one-dimensional quantized coefficient stream agrees with that in the one-dimensional quantized coefficient stream, a lesser-important stream producing circuit 102 made of a subtracting circuit for subtracting the important one-dimensional quantized coefficient stream from the one-dimensional quantized coefficient stream produced in the scanning circuit 712 to produce a lesser-important one-dimensional quantized coefficient stream,
- a second two-dimensional variable-length encoding circuit 103 for encoding the important one-dimensional quantized coefficient stream in two-dimensional variable-length to produce a high priority variable-length code stream,
- the first two-dimensional variable-length encoding circuit 714 for encoding the lesser-important one-dimensional quantized coefficient stream in two-dimensional variable-length to produce a low priority variable-length code stream, the first code stream buffer 715, the quantizing step encoding circuit 724, the motion vector encoding circuit 725, a multiplexing 104 for multiplying the high priority variable-length code stream produced by the second two-dimensional variable-length encoding circuit 103 and code stream control information composed of the quantizing step encoded by the quantizing step encoding circuit 724 and the motion vector encoded by the motion vector encoding circuit 725 to produce a multiplied variable-length code stream, the second code stream buffer 720, a threshold adjusting circuit 105 for adjusting the threshold value according to the speed (or data-rate) of the low priority variable-length code streams output from the buffer 715 and the speed of the multiplied variable-length code streams output from the buffer 720, the quantizing step control circuit 726, the first error correction code adding circuit 716 and the second error correction code adding circuit 721.

In the above configuration, the operation of the image signal encoding apparatus 100 is described with reference to FIGS. 4 and 5.

Figure 1:
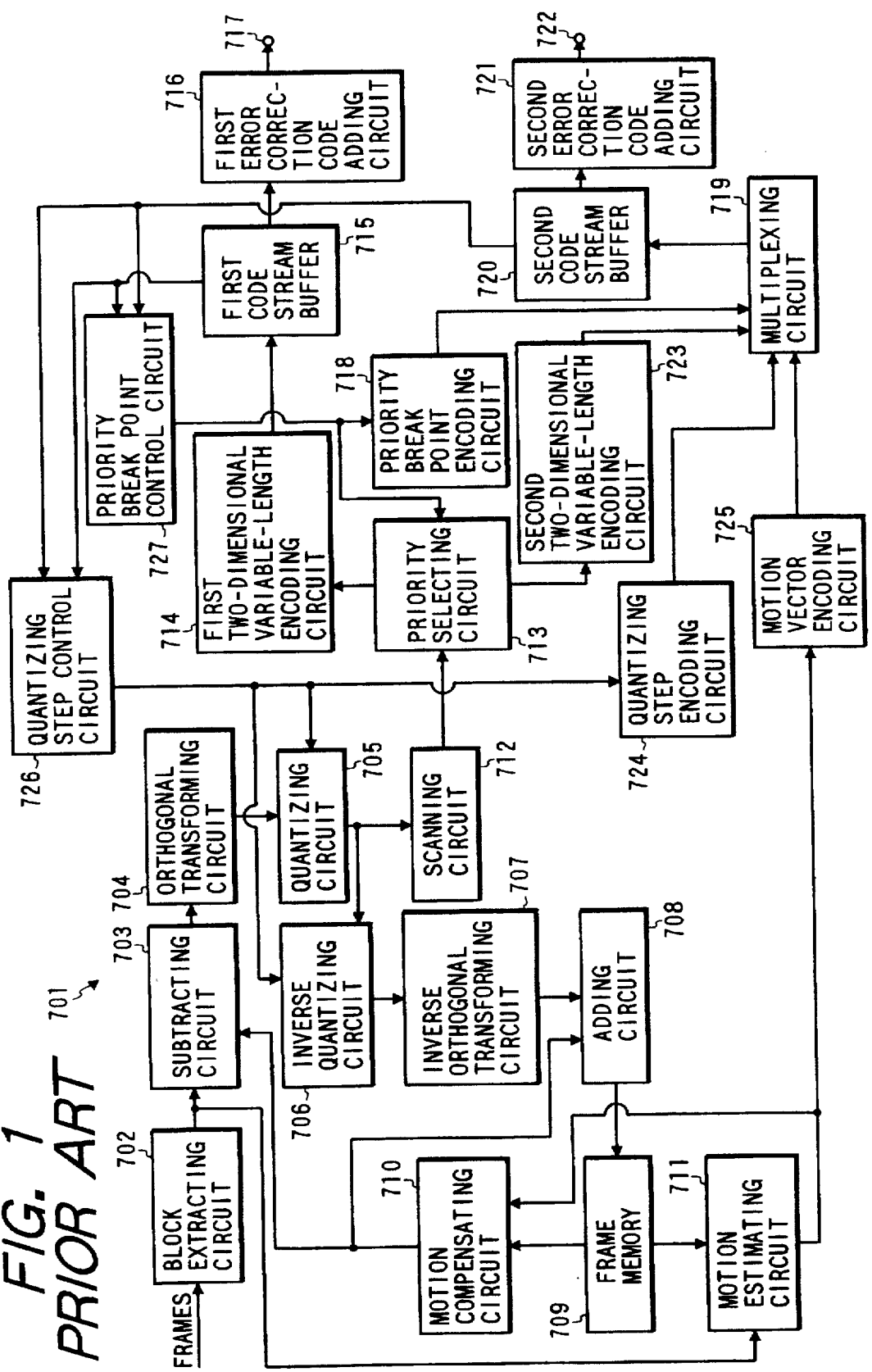
FIG. 1 is a block diagram of a conventional image signal encoding apparatus operated according to the hierarchically layered coding technique with high and low priority.
Figure 2:
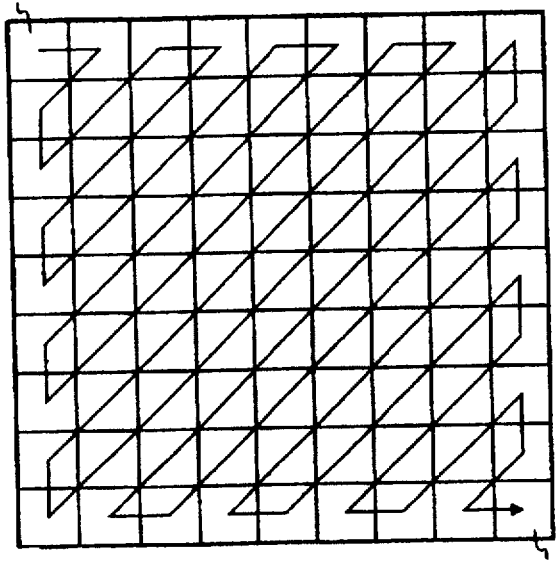
FIG. 2 shows a quantized coefficient block which is scanned in a scanning circuit shown in FIG. 1 in zigzag directions.
Figure 3:
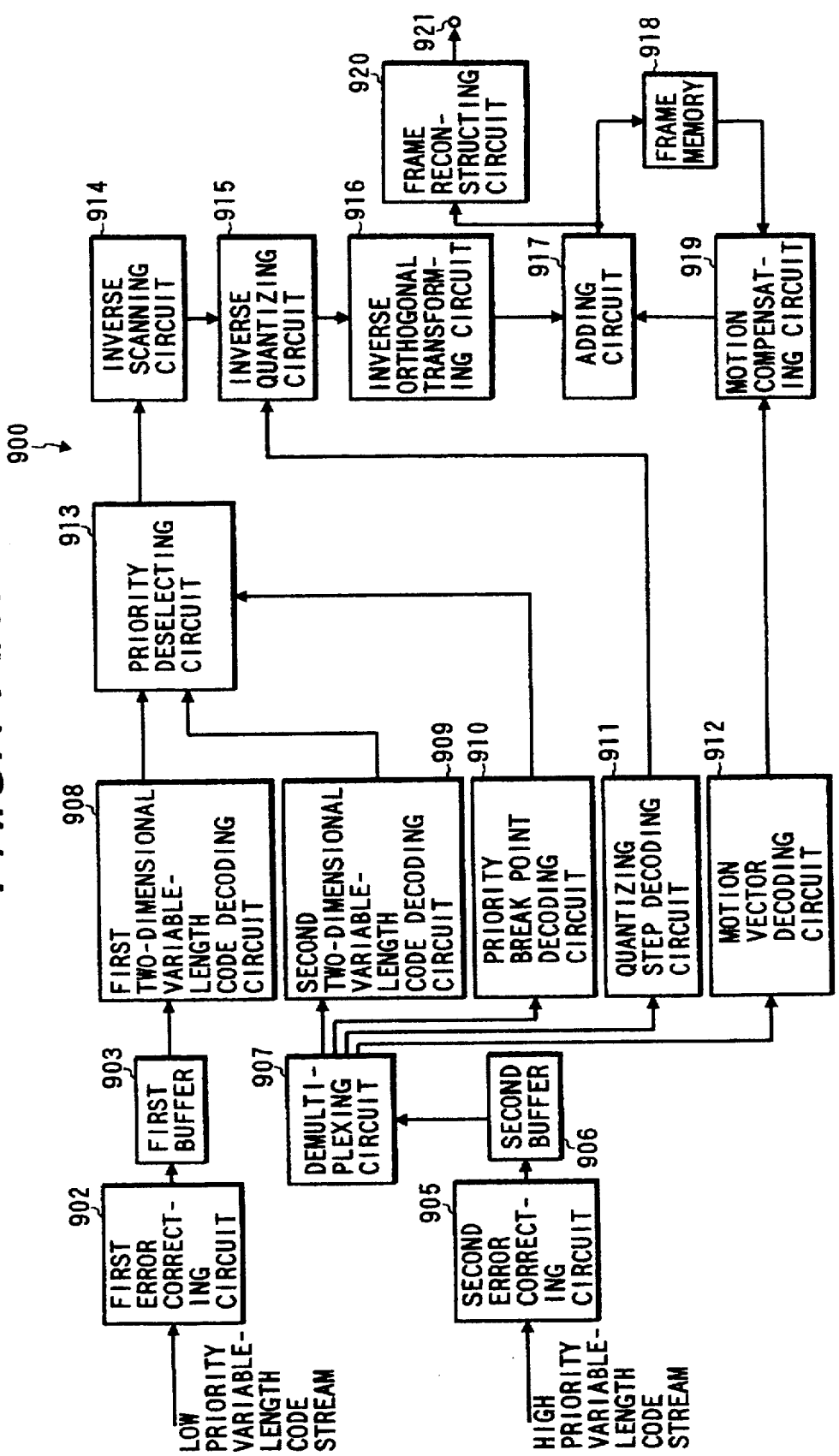
FIG. 3 is a block diagram of a conventional image signal decoding apparatus.

As shown in FIGS. 4 and 5, a quantized coefficient block composed of 8*8 quantized coefficients is scanned in the scanning circuit 712 in zigzag directions (FIG. 2) in the same manner as in the encoding apparatus 701, and a one-dimensional quantized coefficient {3,0,1,−1,0,−2,−1,0,− − − , 0,0} is, for example, output to the important stream producing circuit 101 and the lesser-important stream producing circuit 102.

In the producing circuit 101, one or more important quantized coefficients of which absolute values are higher than a threshold value are extracted from the one-dimensional quantized coefficient stream. Because the threshold value is adjusted to 1 in the threshold adjusting circuit 105, a plurality of important quantized coefficients 3 and −2 are extracted. Thereafter, an important one-dimensional quantized coefficient stream {3,0,0,0,0,−2,0,0,− − − , 0,0} is produced from the important quantized coefficients while adding a plurality of zero-valued quantized coefficients on condition that an arranged order of each important quantized coefficient in the important one-dimensional quantized coefficient stream agrees with that in the one-dimensional quantized coefficient stream. The important one-dimensional quantized coefficient stream is allocated to the high priority hierarchy. Therefore, one or more quantized codes corresponding to one or more two-dimensional events in which one or more non-zero quantized coefficients agree with one or more important quantized coefficients are allocated to the high priority hierarchy.

Thereafter, in the second two-dimensional variable-length encoding circuit 103, the important one-dimensional quantized coefficient stream is encoded in two-dimensional variable-length for each two-dimensional event corresponding to one or more quantized coefficients of the stream, the EOB code indicating that no code corresponding to one two-dimensional event remains in the important one-dimensional quantized coefficient stream is finally added, and a high priority variable-length code stream is produced. Because the two-dimensional events (0,3) and (4,−2) correspond to the quantized coefficients of the important one-dimensional quantized coefficient stream, two variable-length code streams "001010" and "00000011111" and the EOB code "10" are arranged in series, and a high priority variable-length code stream "0010100000001111110" is produced.

Thereafter, the high priority variable-length code stream, the quantizing step encoded by the quantizing step encoding circuit 724 and the motion vector encoded by the motion vector encoding circuit 725 are multiplied in the multiplexing 104, and a multiplied variable-length code stream is produced. The multiplied variable-length code stream is output through the buffer 720 and the second error correction code adding circuit 721 in the same manner as in the encoding apparatus 701.

Also, in the producing circuit 102, the important one-dimensional quantized coefficient stream is subtracted from the one-dimensional quantized coefficient stream produced in the scanning circuit 712, and a lesser-important one-dimensional quantized coefficient stream {0,0,1,−1,0,0,−1,0, − − − , 0,0} is produced. The lesser-important one-dimensional quantized coefficient stream is allocated to the low priority hierarchy.

Thereafter, in the encoding circuit 714, the lesser-important one-dimensional quantized coefficient stream is encoded in two-dimensional variable-length for each two-dimensional event corresponding to one or more quantized coefficients of the stream, the EOB code is finally added, and a low priority variable-length code stream is produced. Because the two-dimensional events (2,1), (0,−1) and (2,−1) correspond to the quantized coefficients of the lesser-important one-dimensional quantized coefficient stream, three variable-length code streams "01010", "111" and "01011" and the EOB code "10" are arranged in series, and a low priority variable-length code stream "010101110101110" is produced. Thereafter, the low priority variable-length code stream is output through the buffer 715 and the first error correction code adding circuit 716 in the same manner as in the encoding apparatus 701.

Also, in the threshold adjusting circuit 105, the threshold value is adjusted to a positive integral number to prevent the occurrence of an underflow or overflow of the variable-length code streams in the buffers 715 and 720. In detail, in cases where a first code volume of the low priority variable-length code streams stored in the buffer 715 approaches a lower limit or a second code volume of the high priority variable-length code streams stored in the buffer 720 approaches an upper limit, the threshold value is increased. Therefore, because the number of important quantized coefficients extracted in the producing circuit 101 is decreased, the first code volume is increased, and the second code volume is decreased. In contrast, in cases where the first code volume in the buffer 715 approaches an upper limit or the second code volume in the buffer 720 approaches a lower limit, the threshold value is decreased. Therefore, because the number of important quantized coefficients extracted in the producing circuit 101 is increased, the first code volume is decreased, and the second code volume is increased.

In cases where all quantized coefficients of the one-dimensional quantized coefficient stream output from the scanning circuit 712 have small values of which absolute values are equal to or lower than the threshold value, the important one-dimensional quantized coefficient stream {0,0, − − − , 0,0} is output from the important stream producing circuit 101. In this case, because no two-dimensional event exists in the important one-dimensional quantized coefficient stream, only the EOB code "10" is transmitted from the encoding circuit 103 to the multiplexing 104. For example, a one-dimensional quantized coefficient stream {0,0,−1,0,0,0,1,0, − − − , 0,0} is output from the scanning circuit 712, a lesser-important one-dimensional quantized coefficient stream {0,0,−1,0,0,0,1,0, − − − , 0,0} is output from the producing circuit, and a low priority variable-length code stream "0101100111010" is output from the encoding circuit 714 because two two-dimensional events (2,−1) and (3,1) corresponds to the lesser-important one-dimensional quantized coefficient stream.

Accordingly, in cases where one or more absolute values of one or more important quantized coefficients of a one-dimensional quantized coefficient stream are higher than the threshold value, regardless of whether each of the important quantized coefficients corresponds to a low or high spatial frequency, one or more particular two-dimensional events relating to the important quantized coefficients are allocated to the high priority hierarchy in the producing circuit 101, one or more quantized coefficients corresponding to the particular two-dimensional events are encoded to a high priority variable-length code stream in the encoding circuit 103, and one or more stronger error correction codes are added to the high priority variable-length code stream. Therefore, even though lesser-important image information designated by one or more lesser-important quantized coefficients of which one or more absolute values are equal to or lower than the threshold value is lost during the transmission or storage, important image information designated by the important quantized coefficients is hardly lost, and a quality of a produced image does not deteriorate.

Also, in cases where one or more lesser-important quantized coefficients of one one-dimensional quantized coefficient stream output from the scanning circuit 712 have small values of which absolute values are equal to or lower than the threshold value, even though each of the lesser-important quantized coefficients corresponds to a low spatial frequency, one or more particular two-dimensional events relating to the lesser-important quantized coefficients are allocated to the low priority hierarchy in the producing circuit 102, one or more quantized coefficients corresponding to the particular two-dimensional events are encoded to a low priority variable-length code stream in the encoding circuit 714, and one or more less-strong error correction codes are added to the low priority variable-length code stream in the encoding circuit 716. Therefore, because image information allocated to the high priority hierarchy is lessen, a transmission efficiency and a storage efficiency can be heightened.

In particular, in cases where all quantized coefficients of one one-dimensional quantized coefficient stream output from the scanning circuit 712 have small values of which absolute values are equal to or lower than the threshold value, regardless of whether each of the quantized coefficients corresponds to a low or high spatial frequency, the quantized coefficients are allocated to the low priority hierarchy in the producing circuit 102, and one or more less-strong error correction codes are added to a low priority variable-length code stream obtained from the one-dimensional quantized coefficient stream. Therefore, because image information allocated to the high priority hierarchy is lessen, a transmission efficiency and a storage efficiency can be extremely heightened.

Figure 6:
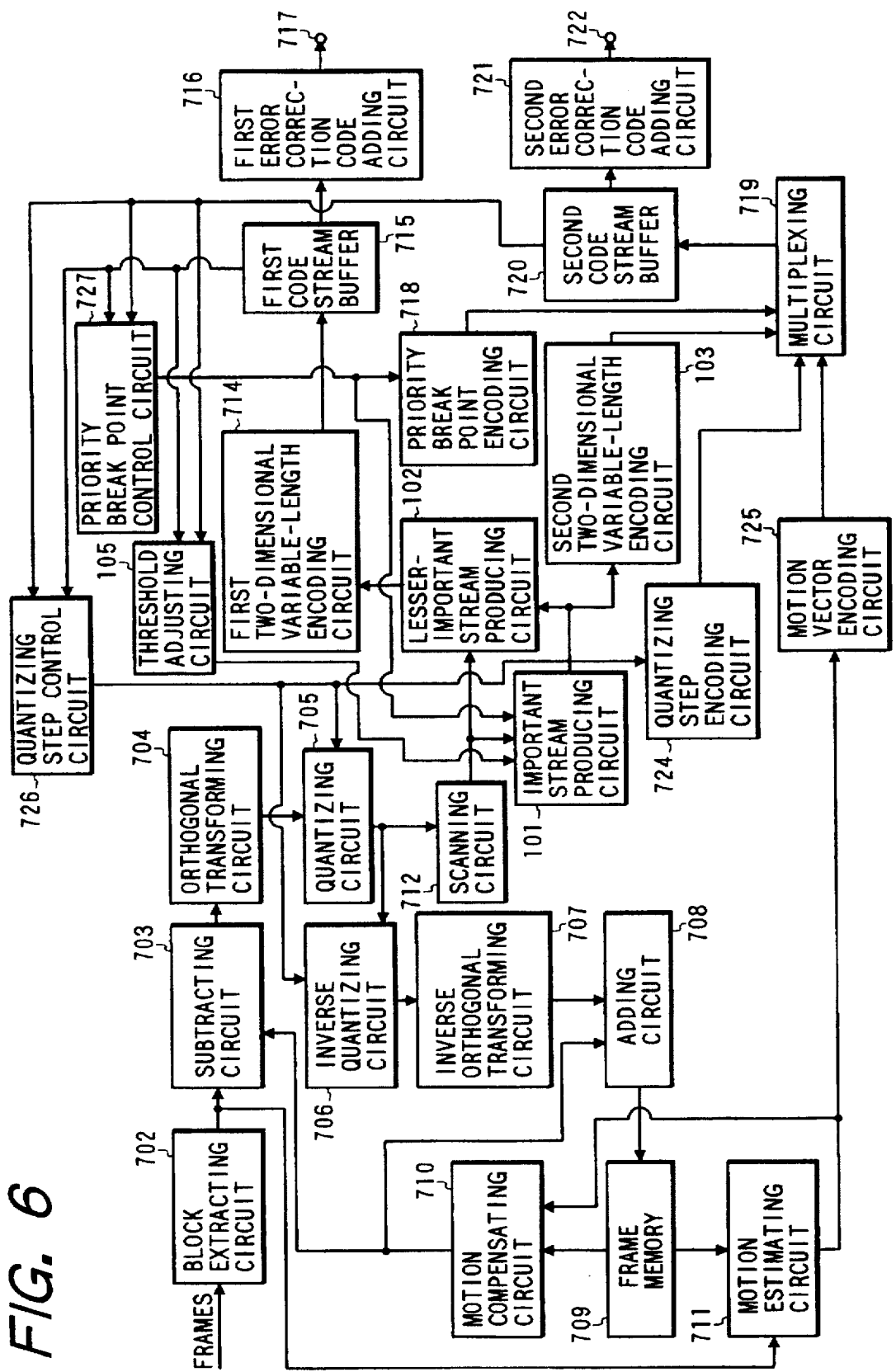
FIG. 6 is a block diagram of an image signal encoding apparatus according to a modification of the first embodiment.

In the first embodiment, all quantized coefficients of which absolute values are higher than the threshold value are regarded as the important quantized coefficients, all two-dimensional events relating to the important quantized coefficients are allocated to the high priority hierarchy. However, as shown in FIG. 6, it is applicable that the number of important quantized coefficients extracted in the producing circuit 101 be limited to a prescribed number indicated by the priority break point by adding the priority break point control circuit 727 and the priority break point encoding circuit 718 to the encoding apparatus 100. In this case, when the number of important quantized coefficients extracted in the producing circuit 101 reaches the prescribed number, it is not required to add the EOB code "10" to the high priority variable-length code stream in the second two-dimensional variable-length encoding circuit 103 because the end of the high priority variable-length code stream is apparent.

Also, each of the variable-length code streams produced in the encoding apparatus 100 is allocated to the high priority hierarchy or the low priority hierarchy. However, it is applicable that the high priority hierarchy be classified into a plurality of N-th ranks of high priority hierarchies. In this case, a plurality of threshold values THi (i=1, - - - , j, - - - , N, 1≦j<N) adjusted in a plurality of threshold adjusting circuits are input to the important stream producing circuit 101, and one or more important quantized coefficients of which absolute values Va satisfy THj<Va≦THj+1 are allocated to the j-th rank of high priority hierarchy. Each important quantized coefficient stream allocated to the j-th rank of high priority hierarchy is processed in a two-dimensional variable-length encoding circuit, a buffer and an error correction code adding circuit, and an important quantized coefficient stream allocated to the N-th rank of high priority hierarchy is processed in the circuits 103, 724, 725, 104 and 721 and the buffer 720.

Next, an image signal decoding apparatus for decoding a plurality of sets of low priority variable-length code streams and high priority variable-length code stream transmitted from the encoding apparatus 100 one after another is described according to the first embodiment.

Figure 7:
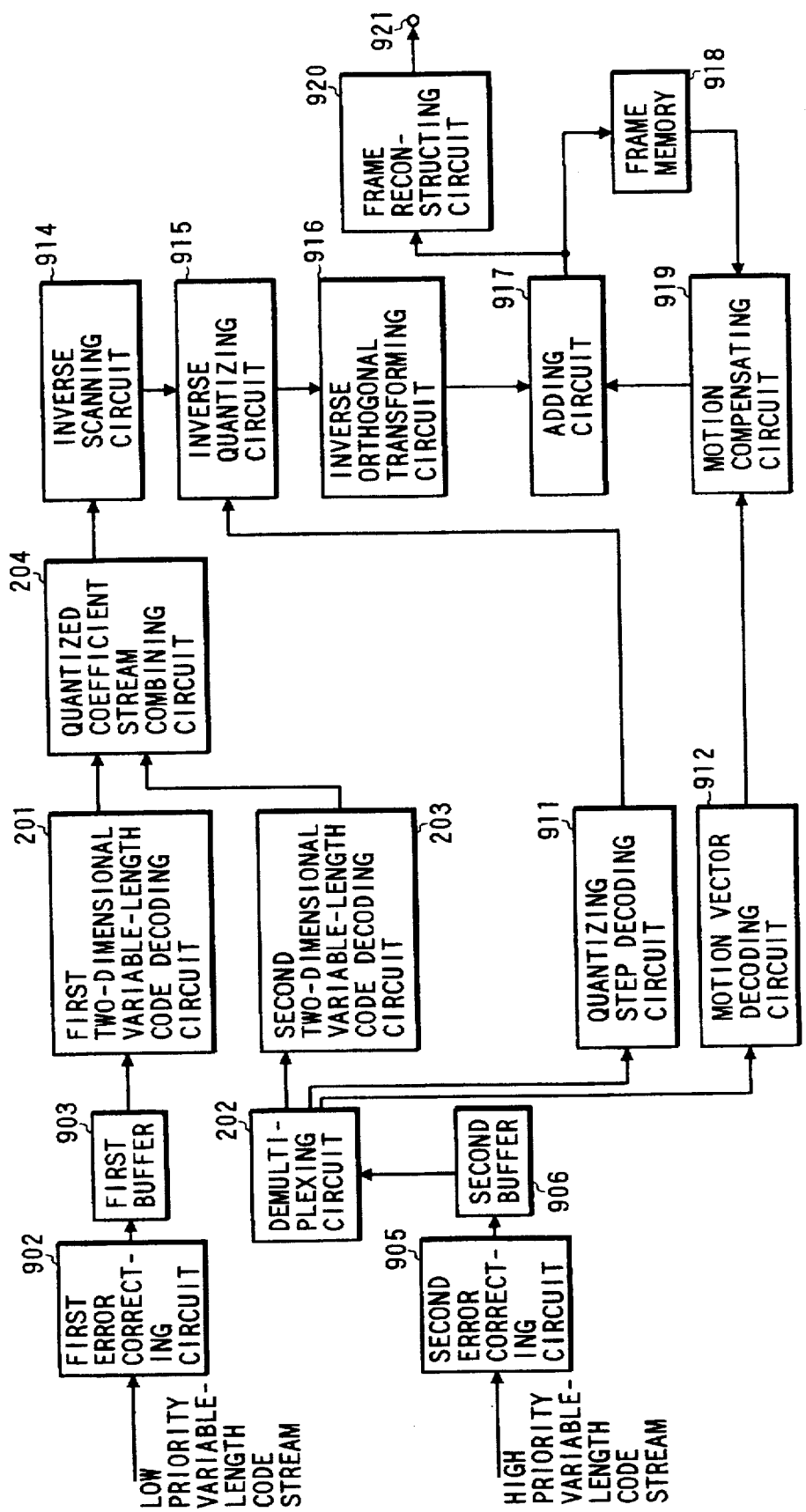
FIG. 7 is a block diagram of an image signal decoding apparatus according to the first embodiment.

FIG. 7 is a block diagram of an image signal decoding apparatus according to the first embodiment.

As shown in FIG. 7, an image signal decoding apparatus 200 comprises

- the first error correcting circuit 902 for correcting one or more errors occurring in one low priority variable-length code stream transmitted from the image signal encoding apparatus 100 according to the less-strong error correction codes added to the code stream and removing the less-strong error correction codes from the low priority variable-length code stream,
- the first buffer 903,
- a first two-dimensional variable-length code decoding circuit 201 for decoding the low priority variable-length code stream to reproduce the lesser-important quantized coefficient stream,
- the second error correcting circuit 905 for perfectly correcting one or more errors occurring in one multiplied variable-length code stream transmitted from the image signal encoding apparatus 100 according to the stronger error correction codes added to the code stream and removing the stronger error correction code from the multiplied variable-length code stream,
- the second buffer 906,
- a demultiplexing circuit 202 for dividing the multiplied variable-length code stream into the high priority variable-length code stream and the code stream control information composed of the decoded quantized step and the decoded motion vector,
- a second two-dimensional variable-length code decoding circuit 203 for decoding the high priority variable-length code stream to reproduce the important quantized coefficient stream,
- the quantizing step decoding circuit 911, the motion vector decoding circuit 912,
- a quantized coefficient stream combining circuit 204 made of an adder for combining the reproduced lesser-important quantized coefficient stream produced by the decoding circuit 201 and the reproduced important quantized coefficient stream produced by the decoding circuit 203 to reproduce the one-dimensional quantized coefficient stream. the inverse scanning circuit 914, the inverse quantizing circuit 915, the inverse orthogonal transforming circuit 916, the frame memory 918, the motion compensating circuit 919, the adding circuit 917, and the frame reconstructing circuit 920.

In the above configuration, each quantized coefficient of the reproduced lesser-important quantized coefficient stream and a corresponding quantized coefficient of the reproduced important quantized coefficient stream are added each other in the quantized coefficient stream combining circuit 204. Therefore, a current frame is reconstructed in the frame reconstructing circuit 920 in the same manner as in the decoding apparatus 900.

Accordingly, even though one or more code errors occurs very rarely in the high priority variable-length code stream corresponding to important image information which greatly influences a quality of a reproduced image, because the errors are corrected in the second error correcting circuit 905, a reproduced image having a superior image can be obtained. Also, because any priority break point decoding circuit is not required, the configuration of the decoding apparatus 200 can be simplified.

Next, an image signal encoding apparatus according to a second embodiment of the present invention is described.

Figure 8:
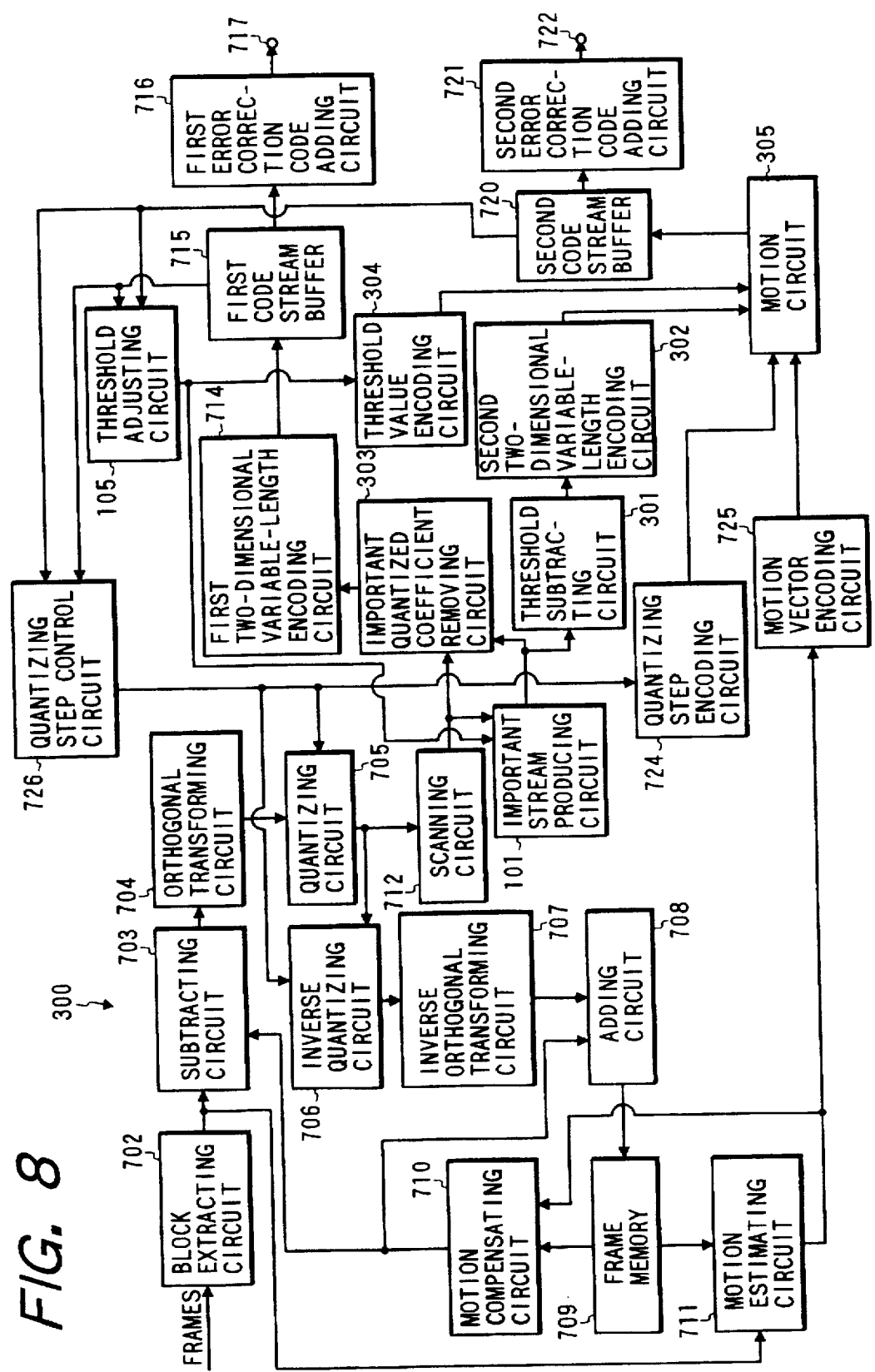
FIG. 8 is a block diagram of an image signal encoding apparatus according to a second embodiment of the present invention.
Figure 9:
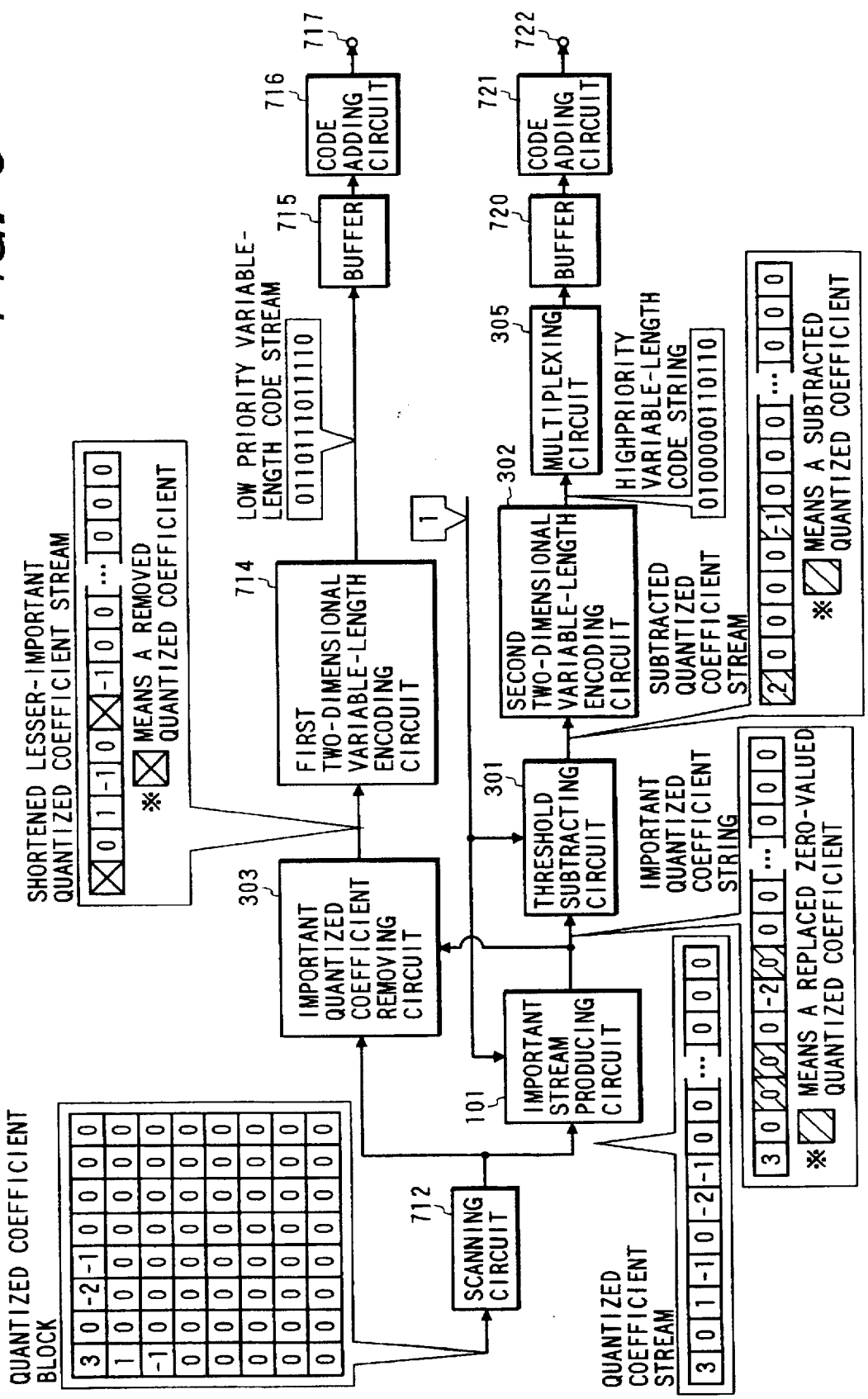
FIG. 9 is an explanatory view of an operation performed in the image signal encoding apparatus shown in FIG. 8.

FIG. 8 is a block diagram of an image signal encoding apparatus according to a second embodiment of the present invention. FIG. 9 is an explanatory view of an operation performed in the image signal encoding apparatus shown in FIG. 8.

As shown in FIG. 8, an image signal encoding apparatus 300 comprises the block extracting circuit 702, the subtracting circuit 703, the orthogonal transforming circuit 704, the quantizing circuit 705, the inverse quantizing circuit 706, the inverse orthogonal transforming circuit 707, the adding circuit 708, the frame memory 709, the motion compensating circuit 710, the motion estimating circuit 711, the scanning circuit 712, the important stream producing circuit 101,

- a threshold subtracting circuit 301 for subtracting the threshold value from each absolute value of the important quantized coefficients of the important one-dimensional quantized coefficient stream to produce a subtracted one-dimensional quantized coefficient stream allocated to the high priority hierarchy,
- a second two-dimensional variable-length encoding circuit 302 for encoding the subtracted one-dimensional quantized coefficient stream in two-dimensional variable-length to produce a high priority variable-length code stream,
- an important quantized coefficient removing circuit 303 for removing the important quantized coefficients from the one-dimensional quantized coefficient stream produced in the scanning circuit 712 to produce a shortened lesser-important one-dimensional quantized coefficient stream allocated to the low priority hierarchy,
- the first two-dimensional variable-length encoding circuit 714, the first code stream buffer 720, the quantizing step encoding circuit 724, the motion vector encoding circuit 725,
- a threshold value encoding circuit 304 for encoding the threshold value,
- a multiplexing 305 for multiplying the high priority variable-length code stream produced by the second two-dimensional variable-length encoding circuit 302 and code stream control information composed of the quantizing step encoded by the quantizing step encoding circuit 724, the motion vector encoded by the motion vector encoding circuit 725 and the threshold value encoded in the threshold value encoding circuit 304 to produce a multiplied variable-length code stream,
- the second code stream buffer 720, the threshold adjusting circuit 105, the quantizing step control circuit 726, the first error correction code adding circuit 716 and the second error correction code adding circuit 721.

In the above configuration, the operation of the image signal encoding apparatus 300 is described with reference to FIGS. 8 and 9.

As shown in FIGS. 8 and 9, a quantized coefficient block composed of 8*8 quantized coefficients is scanned in the scanning circuit 712 in zigzag directions (FIG. 2) in the same manner as in the encoding apparatus 701, and a one-dimensional quantized coefficient {3,0,1,−1,0,−2,−1,0,- - - ,0,0} is, for example, output to the important stream producing circuit 101 and the important quantized coefficient removing circuit 303.

In the producing circuit 101, an important one-dimensional quantized coefficient stream {3,0,0,0,0,−2,0,0,- - -, 0,0} is produced from two important quantized coefficients "3" and "−2" and is allocated to the high priority hierarchy in the same manner as in the first embodiment. Thereafter, in the threshold subtracting circuit 301, the threshold value is subtracted from each absolute value of the important quantized coefficients of the important one-dimensional quantized coefficient stream to produce one or more subtracted quantized coefficients "2" and "−1", and a subtracted one-dimensional quantized coefficient stream {2,0,0,0,0,−1,0,0, - - - ,0,0} is produced.

Thereafter, in the second two-dimensional variable-length encoding circuit 302, the subtracted one-dimensional quantized coefficient stream is encoded in two-dimensional variable-length for each two-dimensional event relating to the subtracted quantized coefficients of the stream, the EOB code indicating that no code corresponding to one two-dimensional event remains in the subtracted one-dimensional quantized coefficient stream is finally added, and a high priority variable-length code stream is produced. Because the two-dimensional events (0,2) and (4,−1) correspond to the quantized coefficients of the subtracted one-dimensional quantized coefficient stream, two variable-length code streams "01000" and "001101" and the EOB code "10" are arranged in series, and a high priority variable-length code stream "0100000110110" is produced.

Also, the threshold value is encoded in the threshold value encoding circuit 304.

Thereafter, the high priority variable-length code stream, the quantizing step encoded by the quantizing step encoding circuit 724, the motion vector encoded by the motion vector encoding circuit 725 and the threshold value encoded in the threshold value encoding circuit 304 are multiplied in the multiplexing 305, and a multiplied variable-length code stream is produced. The multiplied variable-length code stream is output through the buffer 720 and the second error correction code adding circuit 721 in the same manner as in the first embodiment.

Also, in the removing circuit 303, the important quantized coefficients extracted in the producing circuit 101 are removed from a group of quantized coefficients of the one-dimensional quantized coefficient stream produced in the scanning circuit 712 without adding any quantized coefficients in place of the important quantized coefficients, and a shortened lesser-important one-dimensional quantized coefficient stream allocated to the low priority hierarchy is produced. Therefore, the number of quantized coefficients in the shortened lesser-important one-dimensional quantized coefficient stream is lower than that in the one-dimensional quantized coefficient stream by the number of important quantized coefficients. For example, the important quantized coefficients "3" and "−2" are removed from the one-dimensional quantized coefficient stream {3,0,1,−1,0,−2,−1, 0, − − − , 0,0}, and a shortened lesser-important one-dimensional quantized coefficient stream {0,1,−1,0,−1,0, − − − , 0,0} allocated to the low priority hierarchy is output to the first two-dimensional variable-length encoding circuit 714 and is encoded to a low priority variable-length code stream in the same manner as in the first embodiment. Because three two-dimensional events (1,1), (0,−1) and (1,−1) correspond to the quantized coefficients of the shortened lesser-important one-dimensional quantized coefficient stream, three variable-length code streams "0110", "111" and "0111" and the EOB code "10" are arranged in series, and a low priority variable-length code stream "0110111011110" is produced. Thereafter, the low priority variable-length code stream is output through the buffer 715 and the first error correction code adding circuit 716 in the same manner as in the first embodiment.

Accordingly, because the threshold value is subtracted from each of the important quantized coefficients of the important one-dimensional quantized coefficient stream in the threshold subtracting circuit 301 to produce the subtracted one-dimensional quantized coefficient stream from the important one-dimensional quantized coefficient stream, the code volume in the code stream produced from the subtracted one-dimensional quantized coefficient stream is smaller than that in the code stream produced from the important one-dimensional quantized coefficient stream. Therefore, a code efficiency for the image signal allocated to the high priority hierarchy is heightened as compared with that in the first embodiment, and image information indicating the image signal allocated to the high priority hierarchy can be efficiently transmitted to an image signal decoding apparatus or be efficiently stored in a recording medium.

Also, because the important quantized coefficients are removed from a group of quantized coefficients of the one-dimensional quantized coefficient stream in the removing circuit 303 to produce the shortened lesser-important one-dimensional quantized coefficient stream from the one-dimensional quantized coefficient stream, the code volume in the code stream produced from the shortened lesser-important one-dimensional quantized coefficient stream in the second embodiment is smaller than that in the code stream produced from the lesser-important one-dimensional quantized coefficient stream in the first embodiment. Therefore, a code efficiency for the image signal allocated to the low priority hierarchy is heightened as compared with that in the first embodiment, and image information indicating the image signal allocated to the high priority hierarchy can be efficiently transmitted to an image signal decoding apparatus or be efficiently stored in a recording medium.

Also, because the stronger error correction codes are added to the code stream corresponding to the quantized coefficients of the important quantized coefficient stream in which the absolute values of the quantized coefficients are higher than the threshold value regardless of whether each of the quantized coefficients corresponds to a low or high spatial frequency, even though lesser-important image information designated by the shortened lesser-important quantized coefficient stream in which the absolute values of the quantized coefficients are equal to or lower than the threshold value is lost during the transmission or storage, important image information designated by the important quantized coefficient stream is hardly lost, and a quality of a produced image does not deteriorate in the same manner as in the first embodiment.

Also, because the less-stronger error correction codes are added to the low priority variable-length code stream corresponding to the shortened lesser-important quantized coefficient stream in which the absolute values of the quantized coefficients are equal to or lower than the threshold value even though each of the quantized coefficients corresponds to a low spatial frequency, the code volume for the image signal can be reduced, and a transmission efficiency and a storage efficiency can be heightened in the same manner as in the first embodiment.

Next, an image signal decoding apparatus for decoding a plurality of sets of low priority variable-length code streams and high priority variable-length code stream transmitted from the encoding apparatus 300 one after another is described according to the second embodiment.

Figure 10:
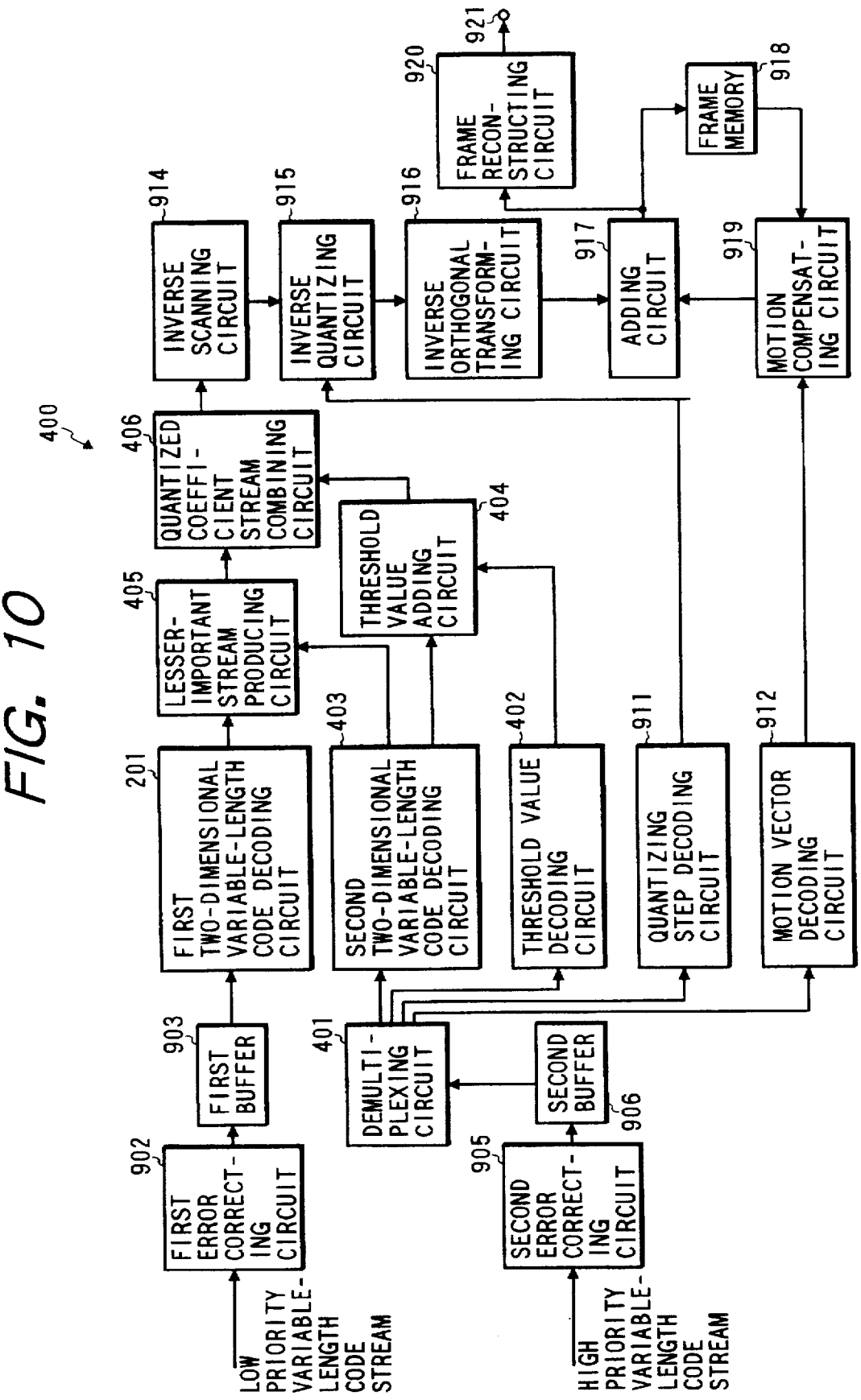
FIG. 10 is a block diagram of an image signal decoding apparatus according to the second embodiment.
Figure 11:
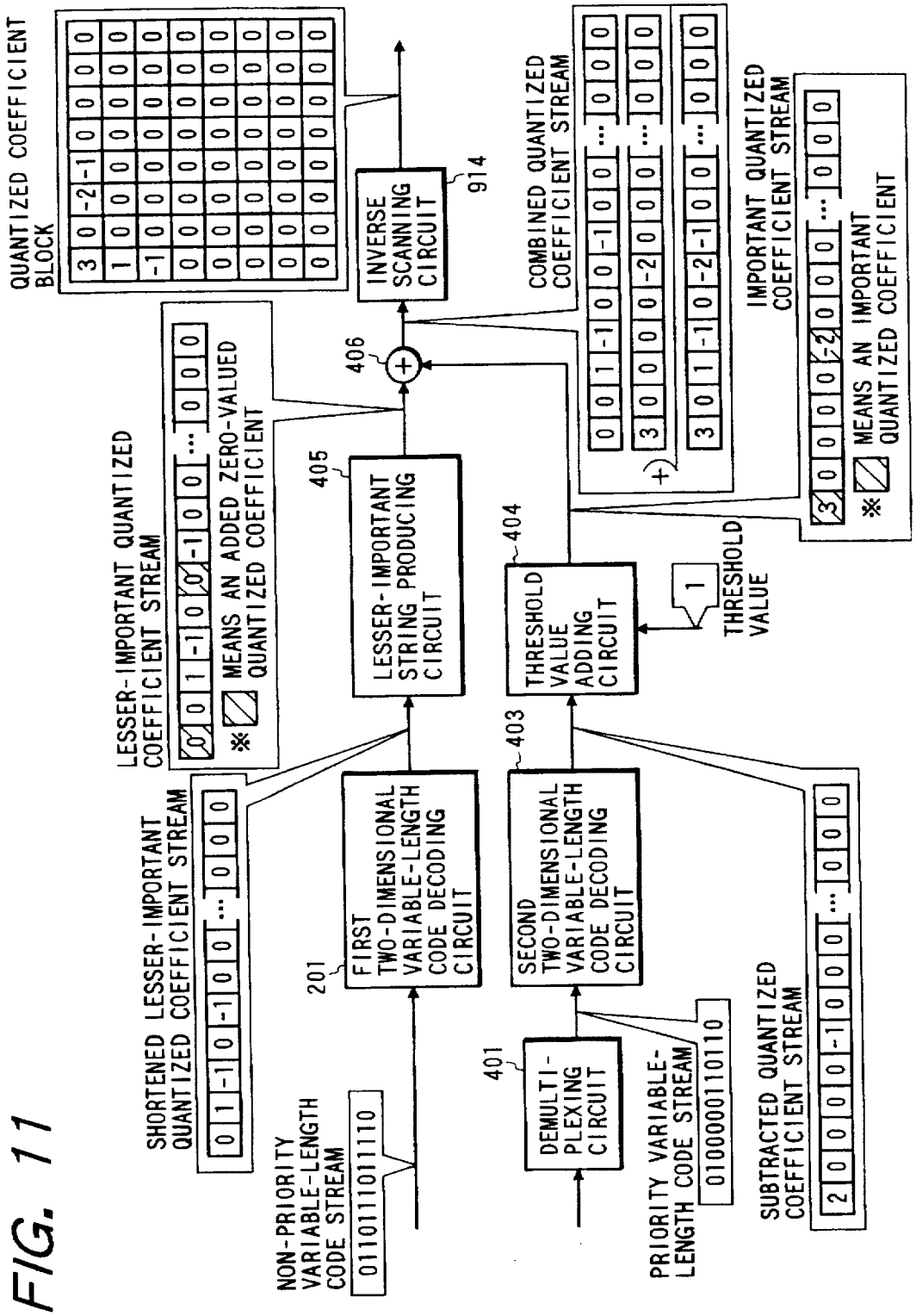
FIG. 11 is an explanatory view of an operation performed in the image signal decoding apparatus shown in FIG. 10.

FIG. 10 is a block diagram of an image signal decoding apparatus according to the second embodiment. FIG. 11 is an explanatory view of an operation performed in the image signal decoding apparatus shown in FIG. 10.

As shown in FIG. 10, an image signal decoding apparatus 400 comprises the first error correcting circuit 902, the first buffer 903, the first two-dimensional variable-length code decoding circuit 201, the second error correcting circuit 905, the second buffer 906, a demultiplexing circuit 401 for dividing the multiplied variable-length code stream into the high priority variable-length code stream and the code stream control information composed of the encoded quantizing step, the encoded motion vector and the encoded threshold value, a threshold value decoding circuit 402 for deciding the encoded threshold value to reproduce the threshold value, a second two-dimensional variable-length code decoding circuit 403 for decoding the high priority variable-length code stream to the subtracted one-dimensional quantized coefficient stream and producing one or more pieces of positional information indicating one or more positions of the subtracted quantized coefficients of the subtracted one-dimensional quantized coefficient stream, the quantizing step decoding circuit 911, the motion vector decoding circuit 912, a threshold value adding circuit 404 for adding the threshold value to each absolute value of the subtracted quantized coefficients of the subtracted one-dimensional quantized coefficient stream produced in the decoding circuit 403 to reproduce the important one-dimensional quantized coefficient stream, a lesser-important stream producing circuit 405 for inserting one or more zero-valued quantized coefficients into the shortened lesser-important one-dimensional quantized coefficient stream reproduced in the decoding circuit 201 according to the positional information to produce a lesser-important one-dimensional quantized coefficient stream in which the number of quantized coefficients is the same as that in the important one-dimensional quantized coefficient stream, a quantized coefficient stream combining circuit 406 made of an adder for combining the important one-dimensional quantized coefficient stream and the lesser-important one-dimensional quantized coefficient stream to reproduce the one-dimensional quantized coefficient stream, the inverse scanning circuit 914, the inverse quantizing circuit 915, the inverse orthogonal transforming circuit 916, the frame memory 918, the motion compensating circuit 919, the adding circuit 917, and the frame reconstructing circuit 920.

In the above configuration, the operation of the image signal decoding apparatus 400 is described with reference to FIGS. 10 and 11.

As shown in FIGS. 10 and 11, the multiplied variable-length code stream allocated to the high priority hierarchy passes through the circuit 905 and the buffer 906 and is demultiplexed into the high priority variable-length code stream, the encoded quantizing step, the encoded motion vector and the encoded threshold value in the demultiplexing circuit 401. The high priority variable-length code stream is decoded to the subtracted one-dimensional quantized coefficient stream in the decoding circuit 403, and the encoded threshold value is decoded in the decoding circuit 402. Also, one or more pieces of positional information indicating one or more positions of the subtracted quantized coefficients of the subtracted one-dimensional quantized coefficient stream are produced in the decoding circuit 403. For example, the high priority variable-length code stream "0100000110110" is decoded to the subtracted one-dimensional quantized coefficient stream {2,0,0,0,0,-1,0,0, - - - , 0,0} in which the subtracted quantized coefficients "2" and "–1" are arranged at the first and sixth positions, the positional information indicating the first and sixth positions of the subtracted quantized coefficients are produced, and the threshold value "1" is reproduced.

Thereafter, in the adding circuit 404, the threshold value is added to each absolute value of the subtracted quantized coefficients of the subtracted one-dimensional quantized coefficient stream to produce one or more important quantized coefficients, and the important one-dimensional quantized coefficient stream composed of the important quantized coefficients and zero-valued quantized coefficients is reproduced. Because of the threshold value "1", the important quantized coefficients "3" and "–2" are produced, and the important one-dimensional quantized coefficient stream {3,0,0,0,0,-2,0,0, - - -, 0,0} is output.

Also, the low priority variable-length code stream allocated to the low priority hierarchy passes through the circuit 902 and the buffer 903 and is decoded to the shortened lesser-important quantized coefficient stream in the decoding circuit 201. For example, the low priority variable-length code stream "0110111011110" is decoded to the shortened lesser-important quantized coefficient stream {0,1,-1,0,-1, 0, - - - , 0,0}. Thereafter, in the lesser-important stream producing circuit 405, one or more zero-valued quantized coefficients are inserted into the shortened lesser-important one-dimensional quantized coefficient stream according to the positional information to place, and a lesser-important one-dimensional quantized coefficient stream in which the zero-valued quantized coefficients are positioned at particular positions indicated by the positional information is produced. In this case, the number of quantized coefficients in the lesser-important one-dimensional quantized coefficient stream is the same as that in the important one-dimensional quantized coefficient stream. Because the positional information indicates the first and sixth positions, the lesser-important one-dimensional quantized coefficient stream {0,0,1,-1,0,0,-1,0, - - - , 0,0} in which two zero-valued quantized coefficients are inserted at the first and sixth positions is produced from the shortened lesser-important quantized coefficient stream.

Thereafter, each quantized coefficient of the important one-dimensional quantized coefficient stream and a corresponding quantized coefficient of the lesser-important one-dimensional quantized coefficient stream are added each other in the quantized coefficient stream combining circuit 406, and the one-dimensional quantized coefficient stream is reproduced. Because the streams {3,0,0,0,0,-2,0,0, - - - , 0,0} and {0,0,1,-1,0,0,-1,0, - - - , 0,0} are added each other, the one-dimensional quantized coefficient stream {3,0,1,-1, 0,-2,-1,0, - - - , 0,0} is reproduced.

Thereafter, the one-dimensional quantized coefficient stream passes through the circuits 914, 915, 916 and 917, and a current frame is reconstructed in the frame reconstructing circuit 920 in the same manner as in the first embodiment.

Accordingly, because a plurality of sets of the multiplied variable-length code stream and the low priority variable-length code stream transmitted one after another at the high code efficiency are decoded in the decoding apparatus 400 to reproduce an image, a reproduced image having a superior image can be efficiently obtained.

Also, even though one or more code errors occurs very rarely in the high priority variable-length code stream corresponding to important image information which greatly influences a quality of a reproduced image, because the errors are corrected in the second error correcting circuit 905, a reproduced image having a superior image can be obtained in the same manner as in the first embodiment.

In the second embodiment, the shortened lesser-important quantized coefficient stream is produced in the removing circuit 303 to heighten the code efficiency. However, because the code efficiency is also heightened by the threshold subtracting circuit 301, the removing circuit 303 is not necessarily required. That is, it is applicable that the lesser-important stream producing circuit 102 be arranged in place of the removing circuit 303.

Also, the threshold subtracting circuit 301 is arranged to heighten the code efficiency. However, because the code efficiency is also heightened by the removing circuit 303,the threshold subtracting circuit 301 is not necessarily required.

Next, an image signal encoding apparatus according to a third embodiment of the present invention is described.

Figure 12:
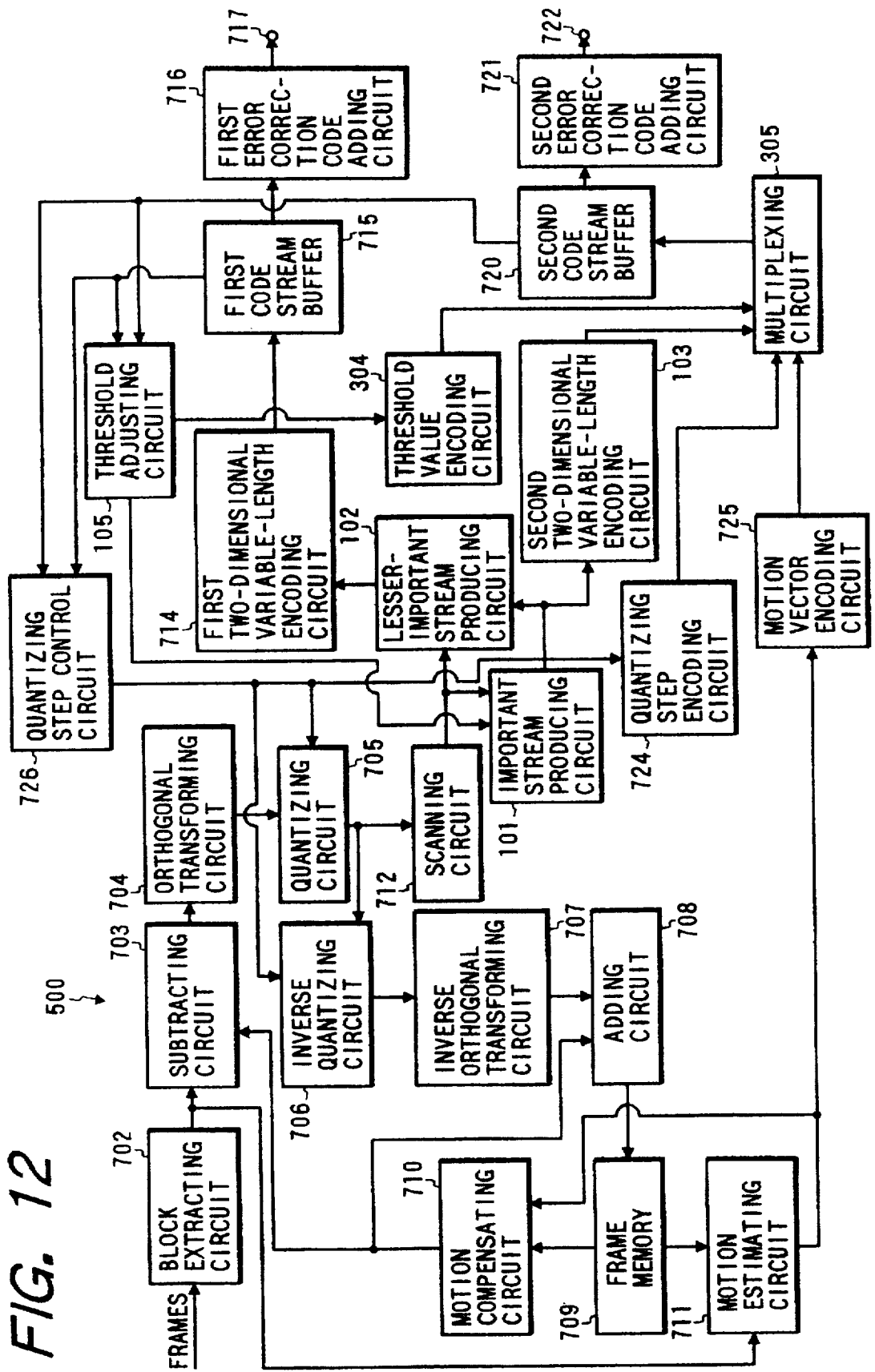
FIG. 12 is a block diagram of an image signal encoding apparatus according to a third embodiment of the present invention.

FIG. 12 is a block diagram of an image signal encoding apparatus according to a third embodiment of the present invention.

As shown in FIG. 12, an image signal encoding apparatus 500 comprises the block extracting circuit 702, the subtracting circuit 703, the orthogonal transforming circuit 704, the quantizing circuit 705, the inverse quantizing circuit 706, the inverse orthogonal transforming circuit 707, the adding circuit 708, the frame memory 709, the motion compensating circuit 710, the motion estimating circuit 711, the scanning circuit 712, the important stream producing circuit 101, the lesser-important stream producing circuit 102, the second two-dimensional variable-length encoding circuit 103, the first two-dimensional variable-length encoding circuit 714, the first code stream buffer 715, the quantizing step encoding circuit 724, the motion vector encoding circuit 725, the threshold value encoding circuit 304, the multiplexing 305, the second code stream buffer 720, the threshold adjusting circuit 105, the quantizing step control circuit 726, the first error correction code adding circuit 716 and the second error correction code adding circuit 721.

In the above configuration, as compared with the image signal encoding apparatus 100 shown in FIG. 4, the threshold value encoding circuit 304 is added and the multiplexing 305 is arranged in place of the multiplexing 104. Therefore, the image signal is encoded, and the multiplied and low priority variable-length code streams are output in the same manner as in the image signal encoding apparatus 100 except that the encoded threshold value is additionally included in the multiplied variable-length code stream.

Next, an image signal decoding apparatus for decoding a plurality of sets of low priority variable-length code streams and high priority variable-length code stream transmitted from the image signal encoding apparatus 500 one after another is described according to the third embodiment.

Figure 13:
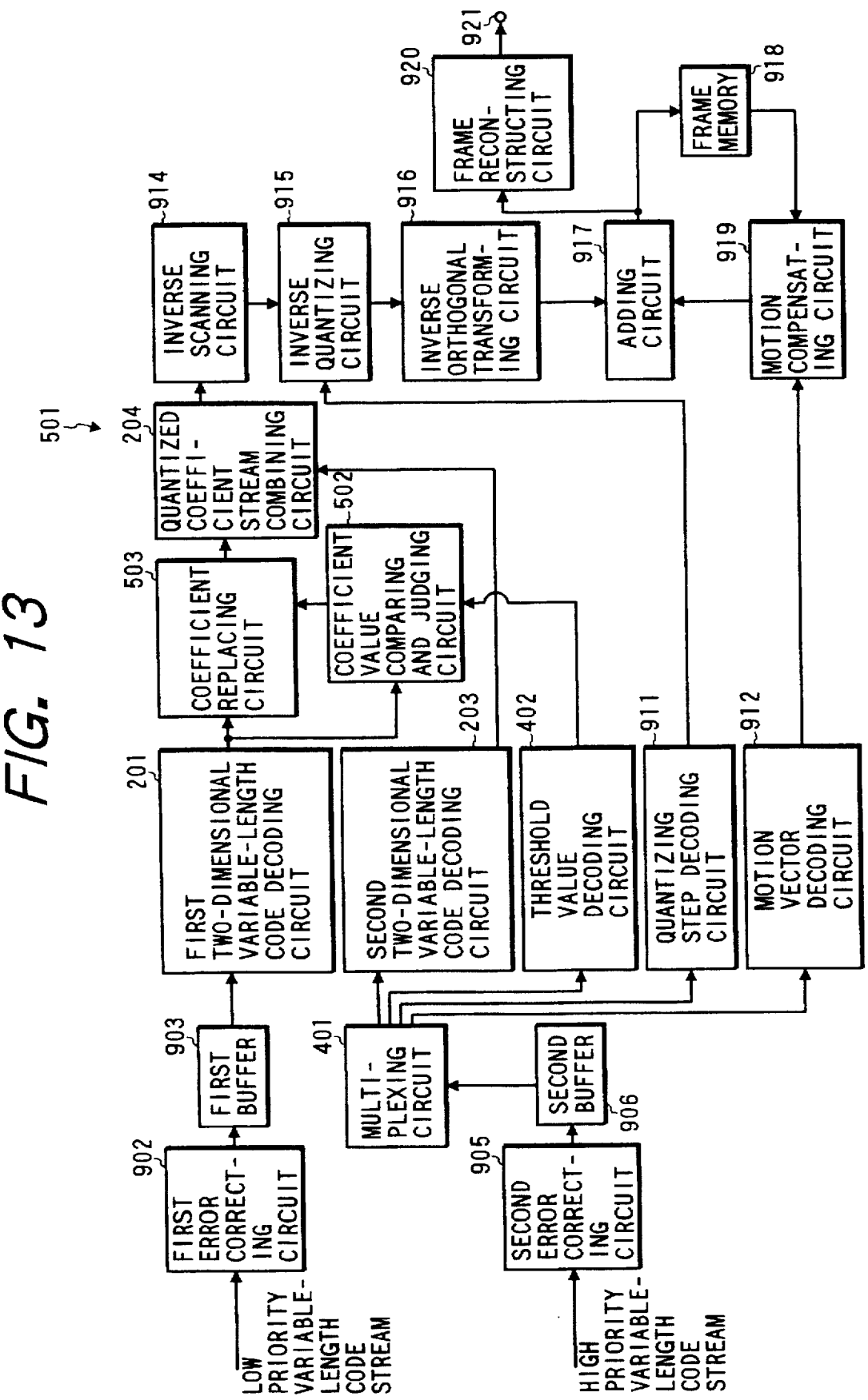
FIG. 13 is a block diagram of an image signal decoding apparatus according to the third embodiment.
Figure 14:
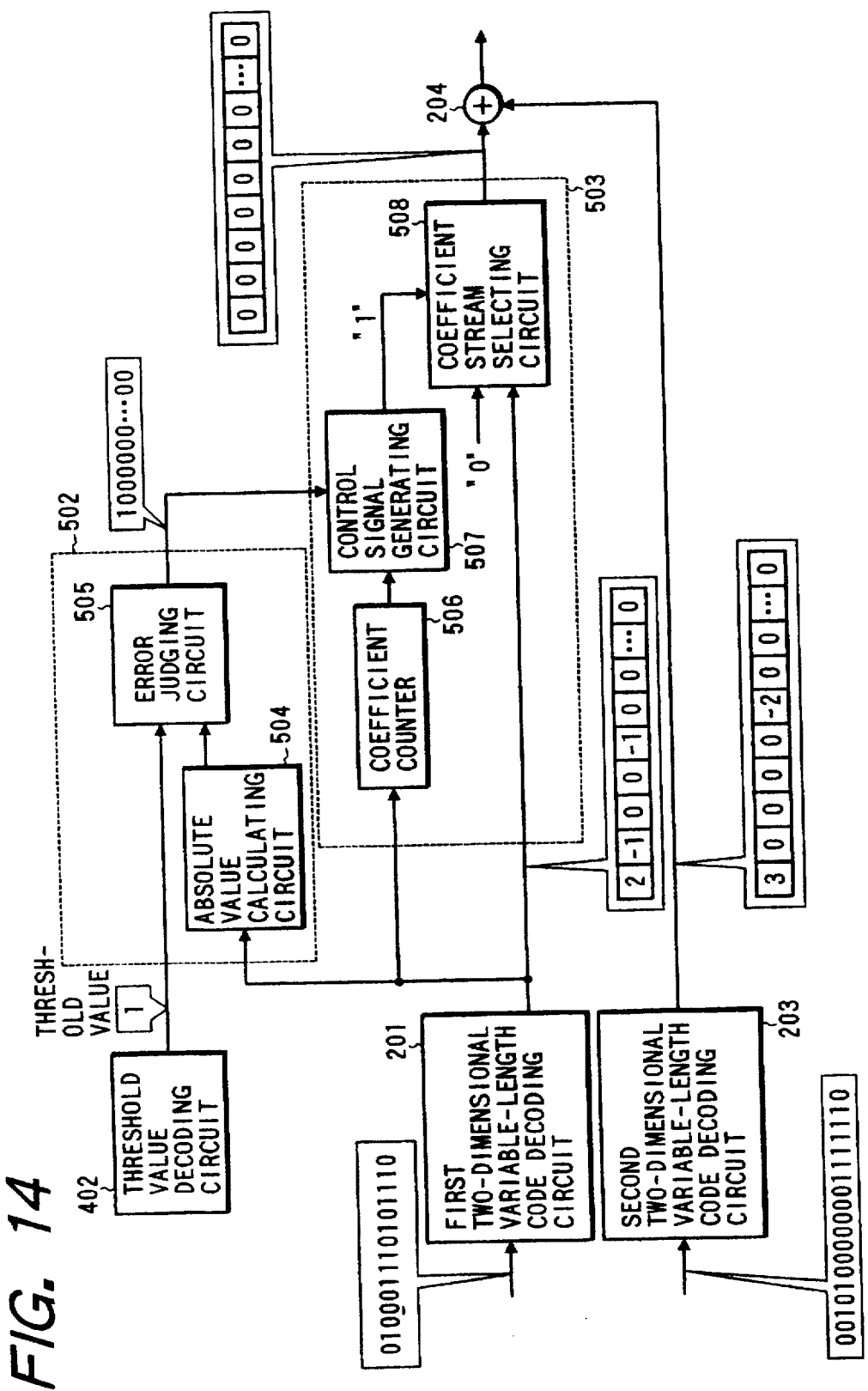
FIG. 14 is an explanatory view of an operation performed in the image signal decoding apparatus shown in FIG. 13.

FIG. 13 is a block diagram of an image signal decoding apparatus according to the third embodiment. FIG. 14 is an explanatory view of an operation performed in the image signal decoding apparatus shown in FIG. 13.

As shown in FIG. 13, an image signal decoding apparatus 501 comprises the first error correcting circuit 902, the first buffer 903, the first two-dimensional variable-length code decoding circuit 201, the second error correcting circuit 905, the second buffer 906, the demultiplexing circuit 401, the threshold value decoding circuit 402, the second two-dimensional variable-length code decoding circuit 203, the quantizing step decoding circuit 911, the motion vector decoding circuit 912, a coefficient value comparing and judging circuit 502 for judging whether each absolute value of quantized coefficients of the lesser-important quantized coefficient stream obtained in the decoding circuit 201 is higher than the threshold value decoded in the decoding circuit 402, a coefficient replacing circuit 503 for replacing each of the quantized coefficients of the lesser-important quantized coefficient stream with a zero-valued quantized coefficient to produce a meaningless quantized coefficient stream in cases where it is judged in the coefficient value comparing and judging circuit 502 that one absolute value of the quantized coefficients of the lesser-important quantized coefficient stream is higher than the threshold value and passing the lesser-important quantized coefficient stream in cases where it is judged in the coefficient value comparing and judging circuit 502 that each absolute value of the quantized coefficients of the lesser-important quantized coefficient stream is equal to or lower than the threshold value, the quantized coefficient stream combining circuit 204 for combining the meaningless quantized coefficient stream or the lesser-important quantized coefficient stream and the important quantized coefficient stream to produce a one-dimensional quantized coefficient stream, the inverse scanning circuit 914, the inverse quantizing circuit 915, the inverse orthogonal transforming circuit 916, the frame memory 918, the motion compensating circuit 919, the adding circuit 917, and the frame reconstructing circuit 920.

As shown in FIG. 14, the coefficient value comparing and judging circuit 502 comprises an absolute value calculating circuit 504 for calculating each absolute value of quantized coefficients of the lesser-important quantized coefficient stream, and an error judging circuit 505 for judging whether each of the absolute values is higher than the threshold value, outputting an error detecting code expressed by a value "1" in cases where one absolute value is higher than the threshold value, and outputting a non-error detecting code expressed by a value "0" in cases where one absolute value is equal to or lower than the threshold value. Therefore, a detecting code stream composed of one or more error detecting codes and/or one or more non-error detecting codes is output to the coefficient replacing circuit 503.

The coefficient replacing circuit 503 comprises a coefficient counter 506 for counting the number of quantized coefficients transmitted from the decoding circuit 201 one after another, resetting a counting value to zero each time the counting value reaches the number of quantized coefficients included in one lesser-important quantized coefficient stream and outputting a count finishing signal each time the counting value is reset, a control signal generating circuit 507 for judging whether or not the error detecting code exists in the detecting code stream output from the error judging circuit 505 during a period from a preceding count finishing signal to a current count finishing signal output from the coefficient counter 506, generating a control signal indicating the existence of a code error in the lesser-important quantized coefficient stream in cases where the error detecting code exists in the detecting code stream, and a coefficient stream selecting circuit 508 for outputting a meaningless quantized coefficient stream composed of a plurality of zero-valued quantized coefficients, of which the number agrees with that of quantized coefficients of the lesser-important quantized coefficient stream, in cases where the control signal is received and passing the lesser-important quantized coefficient stream in cases where any control signal is not received.

In the above configuration, the operation of the image signal decoding apparatus 501 is described with reference to FIGS. 13 and 14.

In cases where the one-dimensional quantized coefficient stream {3,0,1,−1,0,−2,−1,0, - - - , 0,0} is, for example, output from the scanning circuit 712 in the encoding apparatus 500 shown in FIG. 12, the important quantized coefficient stream {3,0,0,0,0,−2,0,0, - - - , 0,0} allocated to the high priority hierarchy and the lesser-important quantized coefficient stream {0,0,1,−1,0,0,−1,0, - - - , 0,0} allocated to the low priority hierarchy are produced on condition that the threshold value is "1". As shown in FIGS. 13 and 14, because the two-dimensional events (0,3) and (4,−2) correspond to the important quantized coefficient stream and the two-dimensional events (2,1), (0,−1) and (2,−1) correspond to the lesser-important quantized coefficient stream, the high priority variable-length code stream "001010 00000011111 10" allocated to the high priority hierarchy and the low priority variable-length code stream "01010 111 01011 10" allocated to the low priority hierarchy are transmitted from the encoding apparatus 500 to the decoding apparatus 501.

In cases where a code error occurs at the fourth position of the low priority variable-length code stream during the transmission and the code error is not corrected in the first correcting circuit 902, an erred low priority variable-length code stream "01000 111 01011 10" is decoded in the decoding circuit 201 in place of the low priority variable-length code stream. Because the code stream "01000" corresponds to a two-dimensional event (0,2), an erred lesser-important quantized coefficient stream {2,−1,0,0,−1,0,0, - - - , 0,0} corresponding to the series of two-dimensional events (0,2), (0,−1) and (2,−1) is output from the decoding circuit 201.

Thereafter, a plurality of quantized coefficients of the erred lesser-important quantized coefficient stream are transmitted to the absolute value calculating circuit 504 and the coefficient counter 506 one after another. In the calculating circuit 504, absolute values of the quantized coefficients are calculated. Thereafter, it is judged in the error judging circuit 505 whether or not each of the absolute values is higher than the threshold value "1". In cases where one absolute value is higher than the threshold value "1", an error detecting code expressed by a value "1" is output to the generating circuit 507. In contrast, in cases where one absolute value is equal to or lower than the threshold value "1", a non-error detecting code expressed by a value "0" is output to the generating circuit 507. Because absolute values of the quantized coefficients of the lesser-important quantized coefficient stream are definitely equal to or lower than the threshold value in cases where any code error does not exist in the low priority variable-length code stream, the existence of the code error can be detected by judging whether or not each of the absolute values is higher than the threshold value. In this example, because an absolute value of the first code "2" of the erred lesser-important quantized coefficient stream is higher than the threshold value "1" and absolute values of the other codes are equal to or lower than the threshold value "1", a detecting code stream "100- - -" is output to the generating circuit 507.

In the coefficient replacing circuit 503, a counting value counted by the coefficient counter 506 is incremented until the counting value reaches a prescribed number equal to the number (8*8) of quantized coefficients included in one lesser-important quantized coefficient stream. When the counting value reaches the prescribed number, a count finishing signal is output from the counter 506, and the counting value is reset to zero. When a current count finishing signal is received in the generating circuit 507, it is judged in the generating circuit 507 whether or not the error detecting code is included in the detecting code stream received during a period from the reception of a preceding count finishing signal to the reception of the current count finishing signal. In cases where the error detecting code is included in the detecting code stream, a control signal is output to the coefficient stream selecting circuit 508. In this example, because the error detecting code "1" is included in the detecting code stream in which 8*8 detecting codes exist, a control signal expressed by a value "1" is output to the coefficient stream selecting circuit 508.

In the selecting circuit 508, in cases where the control signal is received, because the code error exists in the erred lesser-important quantized coefficient stream, a meaningless quantized coefficient stream composed of a plurality of zero-valued quantized coefficients of which the number agrees with that of quantized coefficients of the lesser-important quantized coefficient stream is output to the combining circuit 204 in place of the erred lesser-important quantized coefficient stream. In contrast, in cases where any control signal is not received, the lesser-important quantized coefficient stream passes through the selecting circuit 508.

In contrast, the high priority variable-length code stream "001010 00000011111 10" is reliably decoded to the important quantized coefficient stream {3,0,0,0,0,-2,0,0, - - -, 0,0} in the decoding circuit 203 without any erroneous decoding because the stronger error correction codes are added to the high priority variable-length code stream and the high priority variable-length code stream is reliably corrected in the second error correcting circuit 905 even though a code error occurs.

Thereafter, in cases where the code error remains in the lesser-important quantized coefficient stream, the important quantized coefficient stream and the meaningless quantized coefficient stream are added in the combining circuit 204 to produce an error-removed quantized coefficient stream, and a current frame is reconstructed in the same manner as in the first embodiment.

Accordingly, even though a code error occurring in the low priority variable-length code stream during the transmission or storage is not corrected in the first error correcting circuit 902 and the low priority variable-length code stream having the having the code error is decoded to an erred lesser-important quantized coefficient stream, because the existence of the erred lesser-important quantized coefficient stream is detected and the erred lesser-important quantized coefficient stream is replaced with the meaningless quantized coefficient stream composed of the zero-valued quantized coefficients, an image is reproduced by using only the important quantized coefficient stream. Therefore, because the erred lesser-important quantized coefficient stream does not influence the reproduced image, the deterioration of the reproduced image can be suppressed.

Also, because the existence of the erred lesser-important quantized coefficient stream is reliably detected, it is allowed that a probability that a code error occurring in the low priority variable-length code stream during the transmission or storage is not corrected in the first error correcting circuit 902 is increased. Therefore, a plurality of moreover less-stronger error correction codes can be added to the low priority variable-length code stream in the first error correction code adding circuit 716 of the encoding apparatus 500 to heighten the code efficiency for the low priority variable-length code stream.

Also, in cases where one non-zero quantized coefficient corresponding to a low spatial frequency is included in the lesser-important quantized coefficient stream and a code error occurring in a variable-length code relating to the non-zero quantized coefficient is not corrected in the first error correcting circuit 902, because the non-zero quantized coefficient is placed in a fore position of the lesser-important quantized coefficient stream, there is a probability that a plurality of quantized coefficients following the non-zero quantized coefficient are shifted from correct positions in a reproduced lesser-important quantized coefficient stream and a chain of coefficient errors occur in the reproduced lesser-important quantized coefficient stream. However, because the reproduced lesser-important quantized coefficient stream having the chain of coefficient errors is replaced with a meaningless quantized coefficient stream, a heavy deterioration of the reproduced image can be prevented.

Next, an image signal decoding apparatus for decoding a plurality of sets of low priority variable-length code streams and high priority variable-length code stream transmitted from the image signal encoding apparatus 100 one after another is described according to a fourth embodiment.

Figure 15:
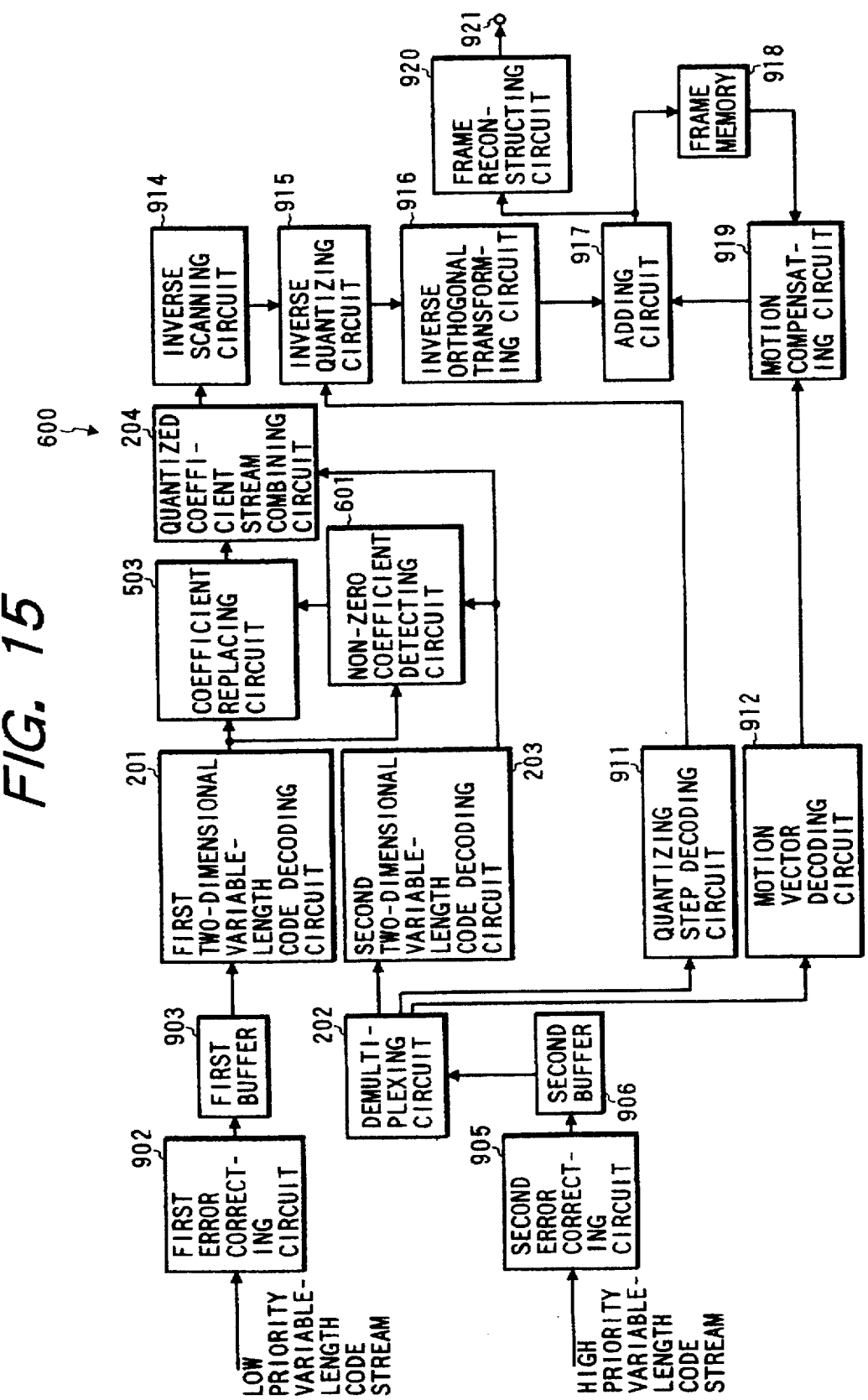
FIG. 15 is a block diagram of an image signal decoding apparatus according to a fourth embodiment.
Figure 16:
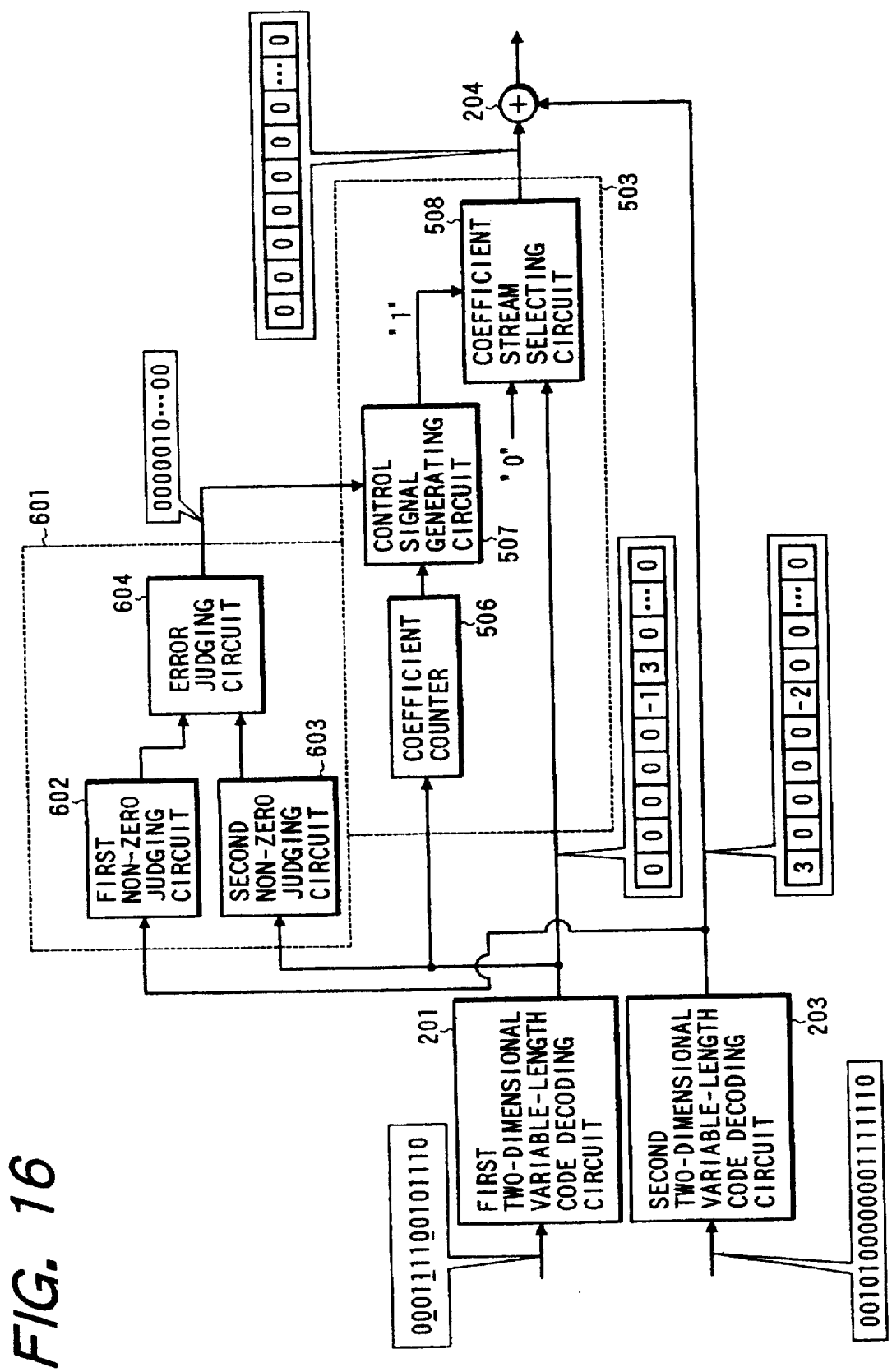
FIG. 16 is an explanatory view of an operation performed in the image signal decoding apparatus shown in FIG. 15.

FIG. 15 is a block diagram of an image signal decoding apparatus according to the fourth embodiment. FIG. 16 is an explanatory view of an operation performed in the image signal decoding apparatus shown in FIG. 15.

As shown in FIG. 15, an image signal decoding apparatus 600 comprises the first error correcting circuit 902, the first buffer 903, the first two-dimensional variable-length code decoding circuit 201, the second error correcting circuit 905, the second buffer 906, the demultiplexing circuit 202, the second two-dimensional variable-length code decoding circuit 203, the quantizing step decoding circuit 911, the motion vector decoding circuit 912, a non-zero coefficient judging circuit 601 for judging whether or not one non-zero quantized coefficient of the lesser-important quantized coefficient stream decoded in the decoding circuit 201 is placed at the same position as that at which one non-zero quantized coefficient of the important quantized coefficient stream decoded in the decoding circuit 203 is placed, the coefficient replacing circuit 503 for replacing each of the quantized coefficients of the lesser-important quantized coefficient stream with a zero-valued quantized coefficient to produce a meaningless quantized coefficient stream in cases where it is judged in the non-zero coefficient judging circuit 601 that one non-zero quantized coefficient of the lesser-important quantized coefficient stream decoded in the decoding circuit 201 is placed at the same position as that at which one non-zero quantized coefficient of the important quantized coefficient stream decoded in the decoding circuit 203 is placed and passing the lesser-important quantized coefficient stream in cases where it is judged in the non-zero coefficient judging circuit 601 that any of one or more non-zero quantized coefficients of the lesser-important quantized coefficient stream decoded in the decoding circuit 201 is not placed at one of one or more positions at which one or more non-zero quantized coefficients of the important quantized coefficient stream decoded in the decoding circuit 203 are placed, the quantized coefficient stream combining circuit 204, the inverse scanning circuit 914, the inverse quantizing circuit 915, the inverse orthogonal transforming circuit 916, the frame memory 918, the motion compensating circuit 919, the adding circuit 917, and the frame reconstructing circuit 920.

As shown in FIG. 16, the non-zero coefficient judging circuit 601 comprises a first non-zero judging circuit 602 for judging whether or not each of the quantized coefficients of the important quantized coefficient stream is a non-zero value and outputting a first detecting signal each time one non-zero quantized coefficient is detected, a second non-zero judging circuit 603 for judging whether or not each of the quantized coefficients of the lesser-important quantized coefficient stream is a non-zero value in synchronization with the judgement performed in the first non-zero judging circuit 602 and outputting a second detecting signal each time one non-zero quantized coefficient is detected, an error judging circuit 604 made of an AND circuit for judging whether or not the first and second detecting signals are simultaneously received and outputting an error detecting code expressed by a value "1" in cases where the first and second detecting signals are simultaneously received, and outputting a non-error detecting code expressed by a value "0" in cases where the first and second detecting signals are not simultaneously received.

In the above configuration, the operation of the image signal decoding apparatus 600 is described with reference to FIGS. 15 and 16.

In cases where the one-dimensional quantized coefficient stream {3,0,1,–1,0,–2,–1,0, - - - , 0,0} is, for example, output from the scanning circuit 712 in the encoding apparatus 100 shown in FIG. 4, the important quantized coefficient stream {3,0,0,0,0,–2,0,0, - - - , 0,0} allocated to the high priority hierarchy and the lesser-important quantized coefficient stream {0,0,1,–1,0,0,–1,0, - - - , 0,0} allocated to the low priority hierarchy are produced on condition that the threshold value is "1". Therefore, the high priority variable-length code stream "001010 00000011111 10" allocated to the high priority hierarchy and the low priority variable-length code stream "01010 111 01011 10" allocated to the low priority hierarchy are transmitted from the encoding apparatus 100 to the decoding apparatus 600.

In cases where three code errors occur at the second, fifth and eighth positions of the low priority variable-length code stream during the transmission and the code errors are not corrected in the first correcting circuit 902, an erred low priority variable-length code stream "00011 110 01011 10" is decoded in the decoding circuit 201. Because the erred low priority variable-length code stream corresponds to two two-dimensional events (5,–1) and (0,–3) and the EOB code, an erred lesser-important quantized coefficient stream {0,0,0,0,0,–1,3,0, - - - , 0,0} is output from the decoding circuit 201.

In contrast, the high priority variable-length code stream "001010 00000011111 10" is reliably decoded to the important quantized coefficient stream {3,0,0,0,0,–2,0,0, - - - , 0,0} in the decoding circuit 203 without any erroneous decoding because the stronger error correction codes are added to the high priority variable-length code stream and the high priority variable-length code stream is reliably corrected in the second error correcting circuit 905 even though a code error occurs.

Thereafter, quantized coefficients of the erred lesser-important quantized coefficient stream are transmitted to the first non-zero judging circuit 602 one after another, and it is judged whether or not each of the quantized coefficients of the erred lesser-important quantized coefficient stream is a non-zero value. Also, quantized coefficients of the important quantized coefficient stream are transmitted to the second non-zero judging circuit 603 one after another, and it is judged whether or not each of the quantized coefficients of the important quantized coefficient stream is a non-zero value. In this case, the judgement in the first non-zero judging circuit 602 and the judgement in the second non-zero judging circuit 603 are synchronized each other. In other words, a position of one quantized coefficient judged in the first non-zero judging circuit 602 is the same as that of one quantized coefficient judged in the second non-zero judging circuit 603.

Thereafter, in the first non-zero judging circuit 602, a first detecting signal expressed by a value "1" is output each time one non-zero quantized coefficient is detected, and a value "0" is output each time one zero-valued quantized coefficient is detected. In this example, a first detecting signal stream {1,0,0,0,0,1,0,0, - - - , 0,0} is output to the error judging circuit 604. Also, in the second non-zero judging circuit 603, a second detecting signal expressed by a value "1" is output each time one non-zero quantized coefficient is detected, and a value "0" is output each time one zero-valued quantized coefficient is detected. In this example, a second detecting signal stream {0,0,0,0,0,1,1,0, - - - , 0,0} is output to the error judging circuit 604.

Thereafter, it is judged in the error judging circuit 604 whether or not the first and second detecting signals are simultaneously received, an error detecting code expressed by a value "1" is output to the generating circuit 507 in cases where the first and second detecting signals are simultaneously received, and a non-error detecting code expressed by a value "0" is output to the generating circuit 507 in cases where the first and second detecting signals are not simultaneously received. That is, a logical product of the first and second detecting signal trains is output. Because one non-zero quantized coefficient "–1" of the erred lesser-important quantized coefficient stream is placed at the same sixth position as that at which one non-zero quantized coefficient "–2" of the important quantized coefficient stream is placed, a detecting code stream {0,0,0,0,0,1,0,0, - - - , 0,0} is output to the generating circuit 507.

Because there is no probability that one non-zero quantized coefficient of a lesser-important quantized coefficient stream is placed at the same position as that at which one non-zero quantized coefficient of the important quantized coefficient stream is placed in cases where the lesser-important quantized coefficient stream is produced from a low priority variable-length code stream having no code error, the existence of the value "1" in the detecting code stream indicates that one or more code errors occurring in the low priority or high priority variable-length code stream are not corrected in the first or second correcting circuit 902 or 905. In this case, because the stronger error correction codes are added to the high priority variable-length code stream, the existence of the value "1" in the detecting code stream generally indicates that one or more code errors occurring in the low priority variable-length code stream are not corrected in the first correcting circuit 902. Therefore, in cases where the value "1" existing in the detecting code stream is detected in the generating circuit 507, the meaningless quantized coefficient stream composed of a plurality of zero-valued quantized coefficients of which the number agrees with that of quantized coefficients of the lesser-important quantized coefficient stream is output to the combining circuit 204 in place of the erred lesser-important quantized coefficient stream in the same manner as in the third embodiment.

Accordingly, even though a code error occurring in the low priority variable-length code stream during the transmission or storage is not corrected in the first error correcting circuit 902 and the low priority variable-length code stream having the code error is decoded to an erred lesser-important quantized coefficient stream, because the existence of the erred lesser-important quantized coefficient stream is detected by judging whether or not one non-zero quantized coefficient of the lesser-important quantized coefficient stream decoded in the decoding circuit 201 is placed at the same position as that at which one non-zero quantized coefficient of the important quantized coefficient stream decoded in the decoding circuit 203 is placed, the erred lesser-important quantized coefficient stream is replaced with the meaningless quantized coefficient stream composed of the zero-valued quantized coefficients, and an image is reproduced by using only the important quantized coefficient stream. Therefore, because the erred lesser-important quantized coefficient stream does not influence the reproduced image, the deterioration of the reproduced image can be suppressed.

Also, because the existence of the erred lesser-important quantized coefficient stream is reliably detected, even though a probability that a code error occurring in the low priority variable-length code stream during the transmission or storage is not corrected in the first error correcting circuit 902 is increased, the deterioration of the reproduced image can be prevented. Therefore, a plurality of moreover less-strong error correction codes can be added to the low priority variable-length code stream in the first error correction code adding circuit 716 of the encoding apparatus 500 to heighten the code efficiency for the low priority variable-length code stream.

Also, in cases where one non-zero quantized coefficient corresponding to a low spatial frequency is included in the lesser-important quantized coefficient stream and a code error occurring in a variable-length code relating to the non-zero quantized coefficient is not corrected in the first error correcting circuit 902, because the non-zero quantized coefficient is placed in a fore position of the lesser-important quantized coefficient stream, there is a probability that a plurality of quantized coefficients following the non-zero quantized coefficient are shifted from correct positions in a reproduced lesser-important quantized coefficient stream and a chain of coefficient errors occur in the reproduced lesser-important quantized coefficient stream. However, because the reproduced lesser-important quantized coefficient stream having the chain of coefficient errors is replaced with a meaningless quantized coefficient stream, a heavy deterioration of the reproduced image can be prevented.

Next, the combination of the embodiments is described.

Figure 17:
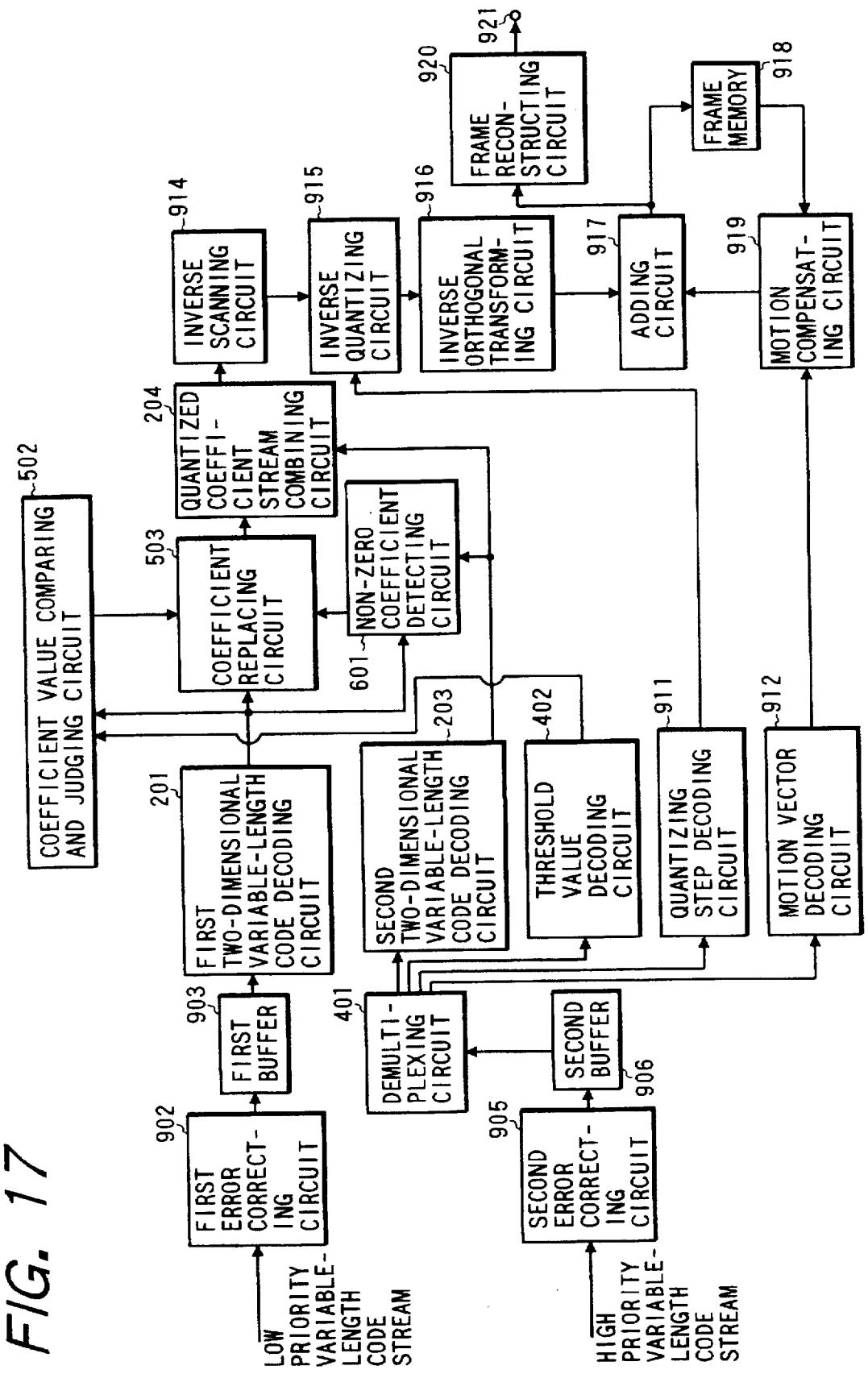
FIG. 17 is a block diagram of an image signal decoding apparatus according to the combination of the third and fourth embodiments.

As shown in FIG. 17, in cases where the non-zero coefficient judging circuit 601 is additionally arranged in the decoding apparatus 501, the third and fourth embodiments are combined, and a lesser-important quantized coefficient stream having one or more errors can be moreover detected with a high precision.

Figure 18:
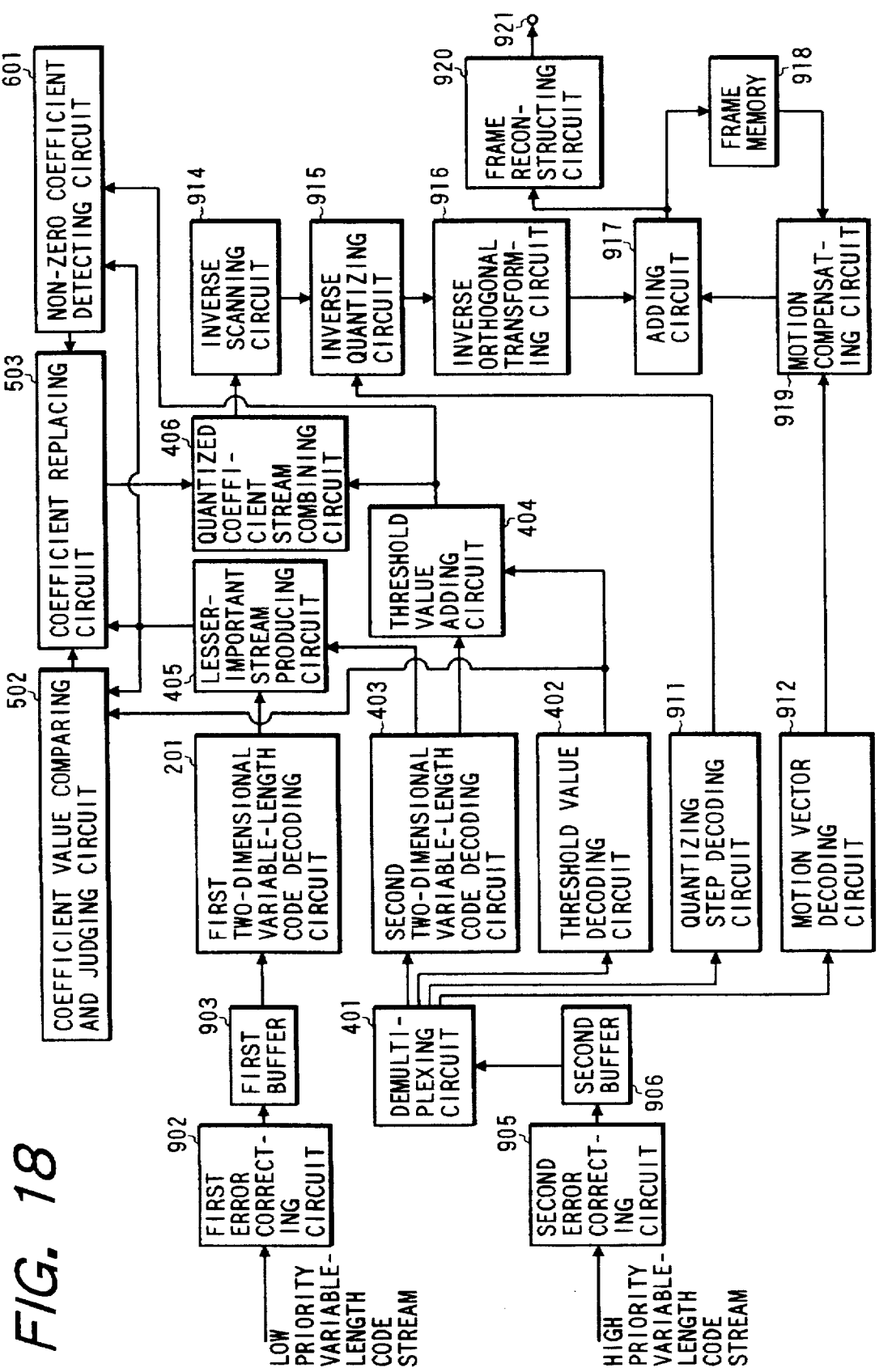
FIG. 18 is a block diagram of an image signal decoding apparatus according to the combination of the second, third and fourth embodiments.

Also, as shown in FIG. 18, in cases where a set of the coefficient value comparing and judging circuit 502 and the coefficient replacing circuit 503, a set of the non-zero coefficient judging circuit 601 and the coefficient replacing circuit 503 or a set of the coefficient value comparing and judging circuit 502, the coefficient replacing circuit 503 and the non-zero coefficient judging circuit 601 is additionally arranged in the decoding apparatus 400, the second and third embodiments, the second and fourth embodiments or the second, third and fourth embodiments are combined. Therefore, a lesser-important quantized coefficient stream having one or more errors can be detected with a high precision on condition that a code efficiency is heightened.

Having illustrated and described the principles of the present invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. An image signal encoding apparatus comprising:

block extracting means for extracting a plurality of blocks respectively composed of a plurality of pixels one after another from a digital image signal;

quantized-coefficient producing means for producing a one-dimensional quantized coefficient stream composed of a plurality of quantized coefficients from each block extracted by the block extracting means;

important stream producing means for extracting one or more important quantized coefficients respectively having an absolute value higher than a threshold value and one or more lesser-important quantized coefficients respectively having an absolute value equal to or lower than the threshold value, said important stream producing means extracting said important and lesser-important quantized coefficients from the quantized coefficients of the one-dimensional quantized coefficient stream produced by the quantized coefficient producing means, and replacing the lesser-important quantized coefficients of the one-dimensional quantized coefficient stream with one or more zero-valued quantized coefficients to produce an important quantized coefficient stream composed of the important quantized coefficients and the zero-valued quantized coefficients on condition that an arranged order of each of the important quantized coefficients in the important quantized coefficient stream agrees with that in the one-dimensional quantized coefficient stream;

high priority variable-length encoding means for encoding the important quantized coefficient stream produced by the important stream producing means to produce a high priority code stream composed of one or more variable-length codes;

lesser-important stream producing means for subtracting the important quantized coefficient stream produced by the important stream producing means from the one-dimensional quantized coefficient stream produced by the quantized coefficient producing means to produce a lesser-important quantized coefficient stream composed of the lesser-important quantized coefficients; and low priority variable-length encoding means for encoding the lesser-important quantized coefficient stream produced by the lesser-important stream producing means to produce a low priority code stream composed of one or more variable length codes.

2. An image signal encoding apparatus according to claim 1, further comprising:

high priority error correction code adding means for adding one or more stronger type error correction codes to the high priority code stream produced by the high priority variable-length encoding means; and low priority error correction code adding means for adding one or more less-strong type error correction codes to the low priority code stream produced by the low priority variable-length encoding means.

3. An image signal encoding apparatus comprising:

high extracting means for extracting a plurality of blocks respectively composed of a plurality of pixels one after another from a digital image signal;

quantized coefficient producing means for producing a one-dimensional quantized coefficient stream composed of a plurality of quantized coefficients from each block extracted by the block extracting means;

important stream producing means for extracting one or more important quantized coefficients respectively having an absolute value higher than a threshold value and one or more lesser-important quantized coefficients respectively having an absolute value equal to or lower than the threshold value from the quantized coefficients of the one-dimensional quantized coefficient stream produced by the quantized coefficient producing means, and replacing the lesser-important quantized coefficients of the one-dimensional quantized coefficient stream with one or more zero-valued quantized coefficients to produce an important quantized coefficient stream composed of the important quantized coefficients and the zero-valued quantized coefficients on condition that an arranged order of each of the important quantized coefficients in the important quantized coefficient stream agrees with that in the one-dimensional quantized coefficient stream;

threshold subtracting means for subtracting the threshold value from each of the important quantized coefficients of the important quantized coefficient stream produced by the important stream producing means to produce a subtracted quantized coefficient stream;

high priority variable-length encoding means for encoding the subtracted quantized coefficient stream produced by the threshold subtracting means to produce a high priority code stream composed of one or more variable-length codes; and low priority hierarchy encoding means for encoding the lesser-important quantized coefficients extracted by the important stream producing means to produce a low priority code stream.

4. An image signal encoding apparatus according to claim 3 in which the low priority hierarchy encoding means comprises important quantized coefficient removing means for subtracting the important quantized coefficients of the important quantized coefficient stream produced by the important stream producing means from the one-dimensional quantized coefficient stream produced by the quantized coefficient producing means to remove the important quantized coefficients from the one-dimensional quantized coefficient stream while the lesser-important quantized coefficients of the one-dimensional quantized coefficient stream are arranged close together in that order and producing a shortened lesser-important quantized coefficient stream composed of the lesser-important quantized coefficients; and low priority variable-length encoding means for encoding the shortened lesser-important quantized coefficient stream produced by the important quantized coefficient removing means to the low priority code stream composed of one or more variable-length codes.

5. An image signal encoding apparatus comprising:

block extracting means for extracting a plurality of blocks respectively composed of a plurality of pixels one after another from a digital image signal;

quantized coefficient producing means for producing a one-dimensional quantized coefficient stream composed of a plurality of quantized coefficients from each block extracted by the block extracting means;

important stream producing means for extracting one or more important quantized coefficients respectively having an absolute value higher than a threshold value and one or more lesser-important quantized coefficients respectively having an absolute value equal to or lower than the threshold value from the quantized coefficients of the one-dimensional quantized coefficient stream produced by the quantized coefficient producing means, and producing an important quantized coefficient stream from the important quantized coefficients;

high priority variable-length encoding means for encoding the important quantized coefficient stream produced by the important stream producing means to produce a high priority code stream;

important quantized coefficient removing means for removing the important quantized coefficients extracted by the important stream producing means from the one-dimensional quantized coefficient stream produced by the quantized coefficient producing means while the lesser-important quantized coefficients of the one-dimensional quantized coefficient stream extracted by the important stream producing means are arranged close together in that order and producing a shortened lesser-important quantized coefficient stream composed of the lesser-important quantized coefficients; and low priority variable-length encoding means for encoding the shortened lesser-important quantized coefficient stream produced by the important quantized coefficient removing means to produce a low priority code stream composed of one or more variable-length codes.

6. An image signal decoding apparatus for reproducing an image signal transformed into a plurality of one-dimensional quantized coefficient streams which each are composed of an important quantized coefficient stream composed of one or more important quantized coefficients of which absolute values are higher than a threshold value and one or more zero-valued quantized coefficients and a lesser-important quantized coefficient stream composed of one or more lesser-important quantized coefficients of which absolute values are equal to or lower than the threshold value, comprising:

demultiplexing means for dividing a high priority code stream, which is obtained by encoding both the threshold value and a subtracted quantized coefficient stream composed of one or more subtracted quantized coefficients and one or more zero-valued quantized coefficients, into an encoded subtracted quantized coefficient stream and an encoded threshold value, each of the subtracted quantized coefficients being obtained by subtracting the threshold value from one important quantized coefficient of one important quantized coefficient stream;

high priority hierarchy decoding means for decoding the encoded subtracted quantized coefficient stream demultiplexed by the demultiplexing means to reproduce the subtracted quantized coefficient stream;

threshold value decoding means for decoding the encoded threshold value demultiplexed by the demultiplexing means to reproduce the threshold value;

threshold value adding means for adding the threshold value decoded by the threshold value decoding means to each of the subtracted quantized coefficients of the subtracted quantized coefficient stream decoded by the high priority hierarchy decoding means to reproduce one important quantized coefficient stream;

low priority hierarchy decoding means for decoding a low priority code stream, which is obtained by encoding each of the lesser-important quantized coefficient streams, to reproduce one lesser-important quantized coefficient stream;

quantized coefficient stream combining means for combining the important quantized coefficient stream reproduced by the threshold value adding means and the lesser-important quantized coefficient stream reproduced by the low priority hierarchy decoding means to reproduce one one-dimensional quantized coefficient stream; and image signal reproducing means for reproducing the image signal from the one-dimensional quantized coefficient streams reproduced one after another by the quantized coefficient stream combining means.

7. An image signal decoding apparatus according to claim 6, further comprising:

high priority error correcting means for correcting one or more first code errors occurring in the high priority code stream according to one or more stronger error correction codes added to the high priority code stream, the high priority code stream of which the first code errors are corrected being demultiplexed by the demultiplexing means; and low priority error correcting means for correcting one or more second code errors occurring in the low priority code stream according to one or more less-strong error correction codes added to the low priority code stream, the low priority code stream of which the second code errors are corrected being decoded by the low priority hierarchy decoding means.

8. An image signal decoding apparatus for reproducing an image signal transformed into a plurality of one-dimensional quantized coefficient streams which each are composed of an important quantized coefficient stream composed of one or more important quantized coefficients of which absolute values are higher than a threshold value and one or more zero-valued quantized coefficients and a lesser-important quantized coefficient stream composed of one or more lesser-important quantized coefficients of which absolute values are equal to or lower than the threshold value, comprising:

high priority hierarchy decoding means for decoding a high priority code stream, which is obtained by encoding each of the important quantized coefficient streams, to reproduce one important quantized coefficient stream and producing one or more pieces of positional information indicating one or more particular positions of the important quantized coefficients of the important quantized coefficient stream;

low priority hierarchy decoding means for decoding a low priority code stream, which is obtained by encoding a shortened lesser-important quantized coefficient stream composed of one or more shortened lesser-important quantized coefficients, to reproduce one shortened lesser-important quantized coefficient stream, each of the shortened lesser-important quantized coefficients being obtained by removing all important quantized coefficients from one one-dimensional quantized coefficient stream while other lesser-important quantized coefficients of the one-dimensional quantized coefficient stream are arranged close together in that order;

lesser-important stream producing means for inserting one or more particular zero-valued quantized coefficients into the shortened lesser-important quantized coefficient stream reproduced by the low priority hierarchy decoding means according to the positional information produced by the high priority hierarchy decoding means to reproduce one lesser-important quantized coefficient stream in which the particular zero-valued quantized coefficients are positioned at the particular positions indicated by the positional information as one or more lesser-important quantized coefficients and the number of lesser-important quantized coefficients of the lesser-important quantized coefficient stream is the same as that of the important quantized coefficient stream reproduced by the high priority hierarchy decoding means;

quantized coefficient stream combining means for combining the important quantized coefficient stream reproduced by the high priority hierarchy decoding means and the lesser-important quantized coefficient stream reproduced by the lesser-important stream producing means to reproduce one one-dimensional quantized coefficient stream; and image signal reproducing means for reproducing the image signal from the one-dimensional quantized coefficient streams reproduced one after another by the quantized coefficient stream combining means.

9. An image signal decoding apparatus according to claim 8, further comprising:

high priority error correcting means for correcting one or more first code errors occurring in the high priority code stream according to one or more stronger error correction codes added to the high priority code stream, the high priority code stream of which the first code errors are corrected being decoded by the high priority hierarchy decoding means; and low priority error correcting means for correcting one or more second code errors occurring in the low priority code stream according to one or more less-strong error correction codes added to the low priority code stream, the low priority code stream of which the second code errors are corrected being decoded by the low priority hierarchy decoding means.

10. An image signal decoding apparatus for reproducing an image signal transformed into a plurality of one-dimensional quantized coefficient streams which each are composed of an important quantized coefficient stream composed of one or more important quantized coefficients of which absolute values are higher than a threshold value and one or more zero-valued quantized coefficients and a lesser-important quantized coefficient stream composed of one or more lesser-important quantized coefficients of which absolute values are equal to or lower than the threshold value, comprising:

demultiplexing means for dividing a high priority code stream, which is obtained by encoding both the threshold value and one important quantized coefficient stream, into an encoded important quantized coefficient stream and an encoded threshold value;

high priority hierarchy decoding means for decoding the encoded important quantized coefficient stream demultiplexed by the demultiplexing means to reproduce one important quantized coefficient stream;

threshold value decoding means for decoding the encoded threshold value demultiplexed by the demultiplexing means to reproduce the threshold value;

low priority hierarchy decoding means for decoding a low priority code stream, which is obtained by encoding each of the lesser-important quantized coefficient streams, to reproduce one lesser-important quantized coefficient stream;

coefficient value comparing and judging means for judging whether each absolute value of the lesser-important quantized coefficients of the lesser-important quantized coefficient stream reproduced by the low priority hierarchy decoding means is higher than the threshold value decoded by the threshold value decoding means;

coefficient stream replacing means for replacing the lesser-important quantized coefficient stream reproduced by the low priority hierarchy decoding means with a meaningless quantized coefficient stream to output the meaningless quantized coefficient stream in cases where it is judged by the coefficient value comparing and judging means that one absolute value of one lesser-important quantized coefficient of the lesser-important quantized coefficient stream is higher than the threshold value and outputting the lesser-important quantized coefficient stream in cases where it is judged by the coefficient value comparing and judging means that the absolute values of all lesser-important quantized coefficients of the lesser-important quantized coefficient stream are equal to or lower than the threshold value;

quantized coefficient stream combining means for combining the important quantized coefficient stream reproduced by the high priority hierarchy decoding means and the lesser-important quantized coefficient stream or the meaningless quantized coefficient stream output from the coefficient stream replacing means to reproduce one one-dimensional quantized coefficient stream; and image signal reproducing means for reproducing the image signal from the one-dimensional quantized coefficient streams reproduced one after another by the quantized coefficient stream combining means.

11. An image signal decoding apparatus according to claim 10 in which the coefficient value comparing and judging means comprises absolute value calculating means for calculating the absolute values of the lesser-important quantized coefficients of the lesser-important quantized coefficient stream; and error judging means for judging whether each of the absolute values calculated by the absolute value calculating means is higher than the threshold value and outputting an error detecting code in cases where one absolute value is higher than the threshold value, and the coefficient stream replacing means comprises coefficient counting means for incrementing a counting value each time one lesser-important quantized coefficient of the lesser-important quantized coefficient stream is received and outputting a count finishing signal in cases where the counting value reaches the number of lesser-important quantized coefficients included in the lesser-important quantized coefficient stream;

control signal generating means for generating a control signal in cases where the error detecting code is output from the error judging means before the count finishing signal is output from the coefficient counting means; and coefficient stream outputting means for outputting the meaningless quantized coefficient stream in cases where the control signal is generated by the control signal generating means and outputting the lesser-important quantized coefficient stream in cases where the control signal is not generated by the control signal generating means.

12. An image signal decoding apparatus according to claim 10 in which the meaningless quantized coefficient stream output from the coefficient stream replacing means is composed of one or more zero-valued quantized coefficients of which the number agrees with the number of important quantized coefficients of one important quantized coefficient stream.

13. An image signal decoding apparatus according to claim 10, further comprising non-zero-valued coefficient judging means for judging whether or not one non-zero-valued lesser-important quantized coefficient of the lesser-important quantized coefficient stream reproduced by the low priority hierarchy decoding means is placed at the same position as that at which one non-zero-valued important quantized coefficient of the important quantized coefficient stream reproduced by the high priority hierarchy decoding means is placed, the lesser-important quantized coefficient stream reproduced by the low priority hierarchy decoding means being replaced with the meaningless quantized coefficient stream to output the meaningless quantized coefficient stream in cases where it is judged by the non-zero-valued coefficient judging means that one non-zero-valued lesser-important quantized coefficient of the lesser-important quantized coefficient stream is placed at the same position as that at which one non-zero-valued important quantized coefficient of the important quantized coefficient stream is placed.

14. An image signal decoding apparatus according to claim 10, further comprising:

high priority error correcting means for correcting one or more first code errors occurring in the high priority code stream according to one or more stronger error correction codes added to the high priority code stream, the high priority code stream of which the first code errors are corrected being demultiplexed by the demultiplexing means; and low priority error correcting means for correcting one or more second code errors occurring in the low priority code stream according to one or more less-strong error correction codes added to the low priority code stream, the low priority code stream of which the second code errors are corrected being decoded by the low priority hierarchy decoding means.

15. An image signal decoding apparatus for reproducing an image signal transformed into a plurality of one-dimensional quantized coefficient streams which each are composed of an important quantized coefficient stream composed of one or more important quantized coefficients of which absolute values are higher than a threshold value and one or more zero-valued quantized coefficients and a lesser-important quantized coefficient stream composed of one or more lesser-important quantized coefficients of which absolute values are equal to or lower than the threshold value, comprising:

high priority hierarchy decoding means for decoding a high priority code stream, which is obtained by encoding each of the important quantized coefficient streams, to reproduce one important quantized coefficient stream;

low priority hierarchy decoding means for decoding a low priority code stream, which is obtained by encoding each of the lesser-important quantized coefficient streams, to reproduce one lesser-important quantized coefficient stream;

non-zero-valued coefficient judging means for judging whether or not one non-zero-valued lesser-important quantized coefficient of the lesser-important quantized coefficient stream reproduced by the low priority hierarchy decoding means is placed at the same position as that at which one non-zero-valued important quantized coefficient of the important quantized coefficient stream reproduced by the high priority hierarchy decoding means is placed, coefficient stream replacing means for replacing the lesser-important quantized coefficient stream reproduced by the low priority hierarchy decoding means with a meaningless quantized coefficient stream to output the meaningless quantized coefficient stream in cases where it is judged by the non-zero-valued coefficient judging means that one non-zero-valued lesser-important quantized coefficient of the lesser-important quantized coefficient stream reproduced by the low priority hierarchy decoding means is placed at the same position as that at which one non-zero-valued important quantized coefficient of the important quantized coefficient stream reproduced by the high priority hierarchy decoding means is placed and outputting the lesser-important quantized coefficient stream in cases where it is judged by the non-zero-valued coefficient judging means that any of one or more non-zero-valued lesser-important quantized coefficients of the lesser-important quantized coefficient stream reproduced by the low priority hierarchy decoding means is not placed at one of one or more positions at which all of one or more non-zero-valued important quantized coefficients of the important quantized coefficient stream reproduced by the high priority hierarchy decoding means are placed;

quantized coefficient stream combining means for combining the important quantized coefficient stream reproduced by the high priority hierarchy decoding means and the lesser-important quantized coefficient stream or the meaningless quantized coefficient stream output from the coefficient stream replacing means to reproduce one one-dimensional quantized coefficient stream; and image signal reproducing means for reproducing the image signal from the one-dimensional quantized coefficient streams reproduced one after another by the quantized coefficient stream combining means.

16. An image signal decoding apparatus according to claim 15 in which the non-zero-valued coefficient judging means comprises high priority non-zero-valued judging means for judging whether or not each of the important quantized coefficients of the important quantized coefficient stream is a non-zero value and outputting a high priority judging code each time it is judged that one important quantized coefficient is a non-zero value;

low priority non-zero-valued judging means for judging whether or not each of the lesser-important quantized coefficients of the lesser-important quantized coefficient stream is a non-zero value and outputting a low priority judging code each time it is judged that one lesser-important quantized coefficient is a non-zero value;

error judging means for judging whether or not the high priority judging code and the low priority judging code are simultaneously output from the high priority non-zero-valued judging means and the low priority non-zero-valued judging means and outputting an error detecting code in cases where it is judged that the high priority judging code and the low priority judging code are simultaneously output, and coefficient counting means for incrementing a counting value each time one lesser-important quantized coefficient of the lesser-important quantized coefficient stream is received and outputting a count finishing signal in cases where the counting value reaches the number of lesser-important quantized coefficients included in the lesser-important quantized coefficient stream;

control signal generating means for generating a control signal in cases where the error detecting code is output from the error judging means before the count finishing signal is output from the coefficient counting means; and coefficient stream outputting means for outputting the meaningless quantized coefficient stream in cases where the control signal is generated by the control signal generating means and outputting the lesser-important quantized coefficient stream in cases where the control signal is not generated by the control signal generating means.

17. An image signal decoding apparatus according to claim 15 in which the meaningless quantized coefficient stream output from the coefficient stream replacing means is composed of one or more zero-valued quantized coefficients of which the number agrees with the number of important quantized coefficients of one important quantized coefficient stream.

18. An image signal decoding apparatus according to claim 15, further comprising:

high priority error correcting means for correcting one or more first code errors occurring in the high priority code stream according to one or more stronger error correction codes added to the high priority code stream, the high priority code stream of which the first code errors are corrected being decoded by the high priority hierarchy decoding means; and low priority error correcting means for correcting one or more second code errors occurring in the low priority code stream according to one or more less-strong error correction codes added to the low priority code stream, the low priority code stream of which the second code errors are corrected being decoded by the low priority hierarchy decoding means.

* * * * *